United States Patent
Narroschke et al.

(10) Patent No.: US 9,774,851 B2
(45) Date of Patent: Sep. 26, 2017

(54) QUANTIZATION PARAMETER FOR BLOCKS CODED IN THE PCM MODE

(71) Applicant: Panasonic Corporation, Osaka (JP)

(72) Inventors: Matthias Narroschke, Schaafheim (DE); Anand Kotra, Frankfurt (DE); Thomas Wedi, Gross-Umstadt (DE); Semih Esenlik, Frankfurt (DE)

(73) Assignee: SUN PATENT TRUST, New York, NY (US)

( * ) Notice: Subject to any disclaimer, the term of this patent is extended or adjusted under 35 U.S.C. 154(b) by 578 days.

(21) Appl. No.: 14/111,788

(22) PCT Filed: Oct. 31, 2012

(86) PCT No.: PCT/EP2012/071585
§ 371 (c)(1),
(2) Date: Oct. 15, 2013

(87) PCT Pub. No.: WO2013/064548
PCT Pub. Date: May 10, 2013

(65) Prior Publication Data
US 2014/0036998 A1 Feb. 6, 2014

Related U.S. Application Data

(60) Provisional application No. 61/555,175, filed on Nov. 3, 2011.

(51) Int. Cl.
*H04N 7/26* (2006.01)
*H04N 19/80* (2014.01)
(Continued)

(52) U.S. Cl.
CPC ....... *H04N 19/0089* (2013.01); *H04N 19/117* (2014.11); *H04N 19/154* (2014.11);
(Continued)

(58) Field of Classification Search
CPC .......................... H04N 19/0089; H04N 19/176
(Continued)

(56) References Cited

U.S. PATENT DOCUMENTS

2004/0101059 A1* 5/2004 Joch ...................... H04N 19/159
375/240.29
2009/0080517 A1* 3/2009 Ko ....................... H04N 19/176
375/240.03
(Continued)

OTHER PUBLICATIONS

International Search Report issued Apr. 25, 2013 in International (PCT) Application No. PCT/EP2012/071585.
(Continued)

*Primary Examiner* — Nguyen Truong
(74) *Attorney, Agent, or Firm* — Wenderoth, Lind & Ponack, L.L.P.

(57) ABSTRACT

The present invention relates to coding of an image of a video sequence block wisely and, in particular, to coding of a block of samples, which may be chrominace or luminance samples, or samples of any color space, by a pulse code modulation (PCM). After PCM coding, deblocking filtering may be applied. The deblocking filter may be selected for the present PCM coded block based on its noise and/or the noise of its adjacent block. The noise of the PCM coded block is indicated by a so-called PCM quantization parameter, which is also encoded in the bitstream.

8 Claims, 36 Drawing Sheets

(51) Int. Cl.
H04N 19/176 (2014.01)
H04N 19/117 (2014.01)
H04N 19/154 (2014.01)
H04N 19/82 (2014.01)
H04N 19/86 (2014.01)
H04N 19/90 (2014.01)

(52) U.S. Cl.
CPC .......... *H04N 19/176* (2014.11); *H04N 19/80* (2014.11); *H04N 19/82* (2014.11); *H04N 19/86* (2014.11); *H04N 19/90* (2014.11)

(58) Field of Classification Search
USPC ...................................... 375/240.03
See application file for complete search history.

(56) References Cited

U.S. PATENT DOCUMENTS

| | | | | |
|---|---|---|---|---|
| 2012/0224640 | A1* | 9/2012 | Sole Rojals | H04N 19/124 375/240.18 |
| 2013/0089154 | A1* | 4/2013 | Chen | H04N 19/70 375/240.25 |
| 2013/0101037 | A1* | 4/2013 | Chono | H04N 19/00781 375/240.12 |

OTHER PUBLICATIONS

Written Opinion of the International Searching Authority issued Apr. 25, 2013 in International (PCT) Application No. PCT/EP2012/071585.
ITU-T Recommendation H.264 (Advanced video coding for generic audiovisual services), Mar. 2010.
Joint Collaborative Team on Video Coding (JCT-VC) of ITU-T SG16 WP3 and ISO/IEC JTC1/SC29/WG11, "WD3:Working Draft 3 of High-Efficiency Video Coding", JCTVC-E603, Mar. 16-23, 2011.
Joint Collaborative Team on Video Coding (JCT-VC) of ITU-T SG16 WP3 and ISO/IEC JTC1/SC29/WG11, "Proposal of enhanced PCM coding in HEVC", JCTVC-E192-r2, Mar. 16-23, 2011.
Joint Collaborative Team on Video Coding (JCT-VC) of ITU-T SG16 WP3 and ISO/IEC JTC1/SC29/WG11, "Pulse code modulation mode for HEVC", JCTVC-D044-rev1, Jan. 20-28, 2011.
Joint Collaborative Team on Video Coding (JCT-VC) of ITU-T SG16 WP3 and ISO/IEC JTC1/SC29/WG11, "Pulse code modulation mode for HEVC", JCTVC-E057-r3, Mar. 16-23, 2011.
Keiichi Chono et al: "Proposal of enhanced PCM coding in HEVC", Mar. 10, 2011. No. JCTVC-E192. Mar. 10, 2011 (Mar. 10, 2011) ISSN: 0000-0007 abstract p. 8. paragraph 1 sections 2.2.1 and A.5.
Chono K et al: "Pulse code modulation mode for HEVC". 4. JCT-VC Meeting: 95. MPEG Meeting: Jan. 20, 2011-Jan. 28, 2011: Daegu:(Joint Collaborative Team on Video Coding of ISO/IEC JTC1/SC29/WG11And ITU-T SG.16): URL: http://wftp3.itu.int/av-arch/jctvc-site/. No. JCTVC-D044. Jan. 15, 2011 (Jan. 15, 2011). XP030008085. ISSN: 0000-0015 section 2.2.
"Text of ISO/IEC 14496-10 FDIS Advanced Video Coding". 64. MPEG Meeting: Mar. 10, 2003-Mar. 14, 2003: Pattaya: (Motion Picture Expert Group or ISO/IEC JTC1/SC29/WG11). No. N5555. Jun. 5, 2003 (Jun. 5, 2003). XP030012739. ISSN: 0000-0360 sections 8.5.5 and 8.7. in particular 8.7.2.2. pp. 31 and 56. definition of "chroma_qp_index_offset".
Joch: "UB Video Comments on Draft Text". 6. JVT Meeting: 63. MPEG Meeting: Dec. 9, 2002-Dec. 13, 2002: Awaji. JP:(Joint Video Team of ISO/IEC JTC1/SC29/WG11 and ITU-T SG.16). No. JVT-F074-L. Dec. 13, 2002 (Dec. 13, 2002). XP030005642. ISSN: 0000-0428 section 3.
Kotra A et al: "Deblocking bug fix for CU-Varying QP's and IPCM blocks". 7. JCT-VC Meeting: 98. MPEG Meeting: Nov. 21, 2011-Nov. 30, 2011: Geneva: (Joint Collaborative Team on Video Coding of ISO/IEC JTC1/SC29/WG11 and ITU-T SG.16): URL: http://wftp3.itu.int/av-arch/jctvc-site/. No. JCTVC-G640 revision 1. Nov. 8, 2011 (Nov. 8, 2011). XP030110624. p. 1, paragraph 1-p. 2, last paragraph.
Van Der Auwera G et al: "Deblocking of IPCM Blocks Containing Reconstructed Samples". 7. JCT-VC Meeting: 98. MPEG Meeting: Nov. 21, 2011-Nov. 30, 2011: Geneva: (Joint Collaborative Team on Video Coding of ISO/IEC JTC1/SC29/WG11 and ITU-T SG. 16): URL: http://wftp3.itu.int/av-arch/jctvc-site/. No. JCTVC-G138. Nov. 8, 2011 (Nov. 8, 2011). Xp030110122. the whole document. in particular section 4 with figure 1b.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d5, Ver.6, 6th Meeting: Torino, IT, Jul. 14-22, 2011.

* cited by examiner

| Corresponding standard | Driving frequency |
|---|---|
| MPEG-4 AVC | 500 MHz |
| MPEG-2 | 350 MHz |
| ... | ... |

QUANTIZATION PARAMETER FOR BLOCKS CODED IN THE PCM MODE

1. FIELD OF THE INVENTION

The present invention relates to the filtering of images. In particular, the present invention relates to deblocking filtering and to its application to PCM-coded samples.

2. DESCRIPTION OF THE RELATED ART

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a typical H.264/MPEG-4 AVC and/or HEVC video encoder 100. A subtractor 105 first determines differences e between a current block to be encoded of an input video image (input signal s) and a corresponding prediction block $\hat{s}$, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal $\hat{s}$. In order to maintain the compatibility between the encoder side and the decoder side, the prediction signal $\hat{s}$ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal $\hat{s}$ and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, sample adaptive offset (SAO) and ALF aim at improving the pixel-wise fidelity ("objective" quality). In particular, SAO adds an offset in accordance with the immediate neighborhood of a pixel. The adaptive loop filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

When compressing and decompressing an image, the blocking artifacts are typically the most annoying artifacts for the user. The deblocking filtering helps to improve the perceptual experience of the user by smoothing the edges between the blocks in the reconstructed image. One of the difficulties in deblocking filtering is to correctly decide between an edge caused by blocking due to the application of a quantizer and between edges which are part of the coded signal. Application of the deblocking filter is only desirable if the edge on the block boundary is due to compression artifacts. In other cases, by applying the deblocking filter, the reconstructed signal may be despaired, distorted. Another difficulty is the selection of an appropriate filter for deblocking filtering. Typically, the decision is made between several low pass filters with different frequency responses resulting in strong or weak low pass filtering. In order to decide whether deblocking filtering is to be applied and to select an appropriate filter, image data in the proximity of the boundary of two blocks are considered.

For instance, H.264/MPEG-4 AVC evaluates the absolute values of the first derivation (derivative) in each of the two neighboring blocks, the boundary of which is to be deblocked. In addition, absolute values of the first derivative across the edge between the two blocks are evaluated, as described, for instance in H.264/MPEG-4 AVC standard, Section 8.7.2.2. HEVC employs a similar mechanism, however, uses also a second derivative.

A deblocking filter may decide for each sample at a block boundary whether it is to be filtered or not and with which filter or filter type. When it is decided that a filter is to be applied, then a low pass filter is applied to smooth across the block boundary. The aim of the decision whether to filter or not is to filter only those samples, for which the large signal change at the block boundary results from the quantization applied in the block-wise processing as described in the background art section above. The result of the deblocking filtering is a smoothed signal at the block boundary. The smoothed signal is less annoying to the viewer than a blocking artifact. Those samples, for which the large signal change at the block boundary belongs to the original signal to be coded, should not be filtered in order to keep high frequencies and thus the visual sharpness. In the case of wrong decisions, the image is either unnecessarily smoothened or remains blocky. The deblocking filtering is performed across the vertical edges of the block (horizontal filtering) and across the horizontal edges of a block (vertical filtering).

FIG. 4A illustrates decision on a vertical boundary (to filter or not to filter with a horizontal deblocking filter) and FIG. 4B illustrates decision on a horizontal boundary (to filter or not with a vertical deblocking filter). In particular, FIG. 4A shows a current block 440 to be decoded and its already decoded neighbouring blocks 410, 420, and 430. For the pixels 460 in a line, the decision is performed. Similarly, FIG. 4B shows the same current block 440 and decision performed for the pixels 470 in a column.

The judgment on whether to apply the deblocking filter may be performed as follows. Let us take a line of six pixels 460, the first three pixels p2, p1, p0 of which belong to a left neighboring block A 430 and the following three pixels q0, q1, and q2 of which belong to the current block B 440 as also illustrated in FIG. 4.

Line 1410 in FIG. 14 illustrates the boundary between the blocks A and B. Pixels p0 and q0 are the pixels of the left neighbor A and of the current block B, respectively, located directly adjacent to each other. Pixels p0 and q0 are filtered by the deblocking filtered for instance, when the following conditions are fulfilled:

$$|p_0-q_0|<\alpha_{H264}(QP_{New}),$$

$$|p_1-p_0|<\beta_{H264}(QP_{New}), \text{ and}$$

$$|q_1-q_0|<\beta_{H264}(QP_{New}),$$

wherein, in general, $\beta_{H264}(QP_{New})<\alpha_{H\ 264}(QP_{New})$. These conditions aim at detecting whether the difference between p0 and q0 stems from blocking artifacts. They correspond to evaluation of the first derivation within each of the blocks A and B and between them. Pixel p1 is filtered if, in addition to the above three conditions, also the following condition is fulfilled:

$$|p_2-p_0|<\beta_{H264}(QP_{New}).$$

Pixel q1 is filtered, for instance, if in addition to the above first three conditions also the following condition is fulfilled:

$$|q_2-q_0|<\beta_{H264}(QP_{New}).$$

These conditions correspond to a first derivation within the first block and a first derivation within the second block, respectively. In the above conditions, QP denotes quantization parameter indicating the amount of quantization applied, and $\beta,\alpha$ are scalar constants. In particular, $QP_{New}$ is quantization parameter derived based on quantization parameters $QP_A$ and $QP_B$ applied to the respective first and second block A and B as follows:

$$QP_{New}=(QP_A+QP_B+1)>>1,$$

wherein ">>1" denoted right shift by one bit.

The decision may be performed only for selected line or lines of a block, while the filtering of pixels accordingly is then performed for all lines 460. An example 520 of lines 530 involved in decision in compliance with HEVC is illustrated in FIG. 5. Based on lines 530, the decision whether to filter entire block is carried out.

Another example of deblocking filtering in HEVC can be found in JCTVC-E603 document, Section 8.6.1, of JTC-VC, of ITU-T SG16 WP3 and ISO/IEC JTC1/SC29/WG11, freely available under http://phenix.int-evry.fr/jct/index.php/.

The two lines 1430 are used to decide whether and how the deblocking filtering is to be applied. The example 1420 assumes the evaluating of the third (with index 2) and the sixth (with index 5) line for the purpose of horizontally blocking filtering. In particular, the second derivative within each of the blocks is evaluated resulting in the obtaining of measures $d_2$ and $d_5$ as follows:

$$d_2=|p2_2-p1_2+p0_2|+|q2_2-2\cdot q1_2+q0_2|,$$

$$d_5=|p2_5-2\cdot p1_5+p0_5|+|q2_5-2\cdot q1_5+q0_5|.$$

The pixels p belong to block A and pixels q belong to block B. The first number after p or q denotes column index and the following number in subscript denotes row number within the block. The deblocking for all eight lines illustrated in the example 520 is enabled when the following condition is fulfilled:

$$d=d_2+d_5<\beta(QP_{Frame}).$$

If the above condition is not fulfilled, no deblocking is applied. In the case that deblocking is enabled, the filter to be used for deblocking is determined. This determination is based on the evaluation of the first derivative between the blocks A and B. In particular, for each line i, wherein i is an integer between 0 and 7, it is decided whether a strong or a weak low pass filter is to be applied. A strong filter is elected if the following condition is fulfilled.

$$|p3_i-p0_i|+|q3_i-q0_i|<(\beta(QP_{Frame})>>3) \wedge$$

$$d<(\beta(QP_{Frame})>>2) \wedge$$

$$|p0_i-q0_i|<((t_c(QP_{Frame})\cdot 5+1)>>1).$$

In compliance with the HEVC model "the strong filter" filters samples $p2_i$, $p1_i$, $p0_i$, $q0_i$, $q1_i$, $q2_i$ using $p3_i$, $p2_i$, $p1_i$, $p0_i$, $q0_i$, $q1_i$, $q2_i$, $q3_i$, whereas a "weak filter" filters samples $p1_i$, $p0_i$, $q0_i$, $q1_i$, using $p2_i$, $p1_i$, $p0_i$, $q0_i$, $q1_i$, $q2_i$. In the above conditions, parameters $\beta$ and $t_c$ are both functions of the quantization parameter $QP_{Frame}$ which may be set for a slice of the image or the like. The values of $\beta$ and $t_c$ are typically derived based on $QP_{Frame}$ using lookup tables.

It is noted that strong filtering is only beneficial for very flat signals. Otherwise, a rather week low pass filtering is of advantage.

The pixels involved in the strong low pass filtering according to conventional hybrid coding are illustrated in FIG. 15A. In particular, FIG. 15A shows samples which are used for filtering. These samples correspond to respective four adjacent pixels left and right to the border between block A and B. These samples are used for filtering which means that their values are input to the filtering processing. FIG. 15A further shows samples which are modified by the filter. These are the three adjacent respective pixel values closest to the border between the block A and B to its right and to its left. These values are modified by the filter, i.e.

they are smoothed. In particular, in the following, the values of the modified samples $p0'_i$, $p1'_i$, $p2'_i$, $q0'_i$, $q1'_i$, and $q2'_i$ of line with index i are listed.

$$p0'_i = \text{Clip}((p2_i + 2 \cdot p1_i + 2 \cdot p0_i + 2 \cdot q0_i + q2_i + 4) \gg 3)$$

$$p1'_i = \text{Clip}((p2_i + p1_i + p0_i + q0_i + 2) \gg 2)$$

$$p2'_i = \text{Clip}((2 \cdot p3_i + 3 \cdot p2_i + p1_i + p0_i + q0_i + 4) \gg 3)$$

$$q0'_i = \text{Clip}((q2_i + 2 \cdot q1_i + 2 \cdot q0_i + 2 \cdot p0_i + p2_i + 4) \gg 3)$$

$$q1'_i = \text{Clip}((q2_i + q1_i + q0_i + p0_i + 2) \gg 2)$$

$$q2'_i = \text{Clip}((2 \cdot q3_i + 3 \cdot q2_i + q1_i + q0_i + 4) \gg 3)$$

The function Clip(x) is defined as follows:

$$\text{Clip}(x) = \begin{cases} 0; & x < 0 \\ \text{max\_allowed\_value}; & x > \text{max\_allowed\_value} \\ x; & \text{else} \end{cases}$$

Hereby, max_allowed_value is a maximum value, which x can have. In the case of PCM coding with k bit samples, the maximum value would be max_allowed_value=$2^k-1$. For instance, in the case of PCM coding with 8 bit samples, the maximum value would be max_allowed_value=255. In the case of PCM coding with 10 bit samples, the maximum value would be max_allowed_value=1023.

The above equations thus describe the process of strong filtering to be applied. As can be seen from the above equations, pixels $p3_i$ and $q3_i$ of the row i are used in the equations, i.e. in the filtering, but they are not modified, i.e. filtered.

FIG. 16B illustrates application of a weak deblocking filter. In particular, samples used for filtering are shown on the left side and samples modified by filtering are shown on the right side. For the weak filter operations only the respective two adjacent pixels on the border between blocks A and B are filtered while respective three adjacent pixels in each of blocks A and B on their border are used. Two decisions are made for the purpose of the weak filtering. The first decision relates to whether a weak filter is to be applied at all or not for a particular line. This decision is based on value Δ which is calculated as follows $$\Delta = (9 \cdot (q0_i - p0_i) - 3 \cdot (q1_i - p1_i) + 8) \gg 4$$

Based on the calculated Δ the filtering is only applied if $|\Delta| < 10 \cdot t_c$. Otherwise the filtering is not applied to the two pixels $p0'_i$ and $q0'_i$ lying on the boundary of the respective blocks A and B. If the filtering is to be applied, it is performed as follows:

$$p0'_i = \text{Clip}(p0_i + \Delta_1)$$

$$q0'_i = \text{Clip}(q0_i - \Delta_1)$$

wherein $\Delta_1 = \text{Clip3}(-t_c, t_c, \Delta)$.

The function Clip(x) is defined as above. The function Clip3(x) is defined as follows:

$$\text{Clip3}(x, a, b) = \begin{cases} a; & x < a \\ b; & x > b \\ x; & \text{else} \end{cases}$$

When it is decided that the filtering is going to be applied and pixels $P0'_i$ and $Q0'_i$ had been filtered it is further decided whether pixels $P1'_i$ and $Q1'_i$ are to be filtered.

Pixel $p1'_i$ is filtered only if $d_p < (\beta/6)$ and correspondingly pixel $q1'_i$ is filtered, only if $d_q < (\beta/6)$. The filtering of these pixels is performed as follows $$p1'_i = \text{Clip}(p1_i + \Delta_{2p})$$

$$q1'_i = \text{Clip}(q1_i + \Delta_{2q})$$

with $\Delta_{2p} = \text{Clip3}(-t_{c2}, t_{c2}, (((p2_i + p0_i + 1) \gg 1) - p1_i + \Delta_1) \gg 1)$ and $t_{c2} = t_c \gg 1$ and $\Delta_{2q} = \text{Clip3}(-t_{c2}, t_{c2}, (((q2_i + q0_i + 1) \gg 1) - q1_i - \Delta_1) \gg 1)$.

In addition to the predictive coding, blocks may be also coded without application of any prediction. The corresponding coding mode is called "pulse coded modulation (PCM) mode". Samples coded in the PCM mode may contain, but do not necessarily contain quantization noise. In accordance with the contribution JCTVC-E192 "Proposal of enhanced PCM coding in HEVC" a switch is adopted in an HEVC encoder and decoder for switching between enabling and disabling the filtering for PCM coded samples. Accordingly, all filters in the loop are switched on or switched off. The switching mechanism is beneficial since it enables switching off the filtering in case PCM coded samples do not contain quantization noise. In such a case, filtering may worsen the quality of the noise-less filtered image. On the other hand, filtering may be beneficial to enable if the PCM samples include the quantization noise.

SUMMARY OF THE INVENTION

In case in which the PCM coded regions without noise are adjacent to the regions that are not PCM coded but rather predicted by temporal or spatial prediction, blocking artifacts may disturb the perceptual quality of the image. Filtering in such a case, on the other hand, may reduce the quality of the PCM coded region without noise.

Given these problems with the existing technology, it would be advantageous to provide an efficient deblocking filtering approach applicable also to the PCM samples in case they are surrounded with samples coded by means of prediction coding.

The particular approach of the present invention is to enable selection of deblocking filter for the PCM coded blocks based on the amount of noise in the PCM coded signal.

According to an aspect of the present invention, a method is provided for decoding a block of samples in an image of a video signal from a bitstream, the block of samples being coded with a pulse-coded modulation, PCM, the method comprising: extracting from the bitstream a PCM quantization parameter indicating amount of noise in the block of samples; selecting deblocking filter to be applied to the block based on the extracted PCM quantization parameter; and applying the selected deblocking filter to the block of samples.

According to another aspect of the present invention, a method is provided for coding a block of samples in an image of a video signal into a bitstream with a pulse-coded modulation, PCM, the method comprising: determining a PCM quantization parameter indicating amount of noise in the block of samples; selecting deblocking filter to be applied to the block based on the extracted PCM quantization parameter; applying the selected deblocking filter to the block of samples; and including into the bitstream the PCM quantization parameter.

According to yet another aspect of the present invention, an apparatus is provided for decoding a block of samples in an image of a video signal from a bitstream, the block of samples being coded with a pulse-coded modulation, PCM, the apparatus comprising: an extracting unit for extracting from the bitstream a PCM quantization parameter indicating amount of noise in the block of samples; a filter selection unit for selecting deblocking filter to be applied to the block based on the extracted PCM quantization parameter; and a filtering unit for applying the selected deblocking filter to the block of samples.

According to still another aspect of the present invention, an apparatus for coding a block of samples in an image of a video signal into a bitstream with a pulse-coded modulation, PCM, the apparatus comprising: a parameter determining unit for determining a PCM quantization parameter indicating amount of noise in the block of samples; a filter selection unit for selecting deblocking filter to be applied to the block based on the extracted PCM quantization parameter; a filtering unit for applying the selected deblocking filter to the block of samples; and an embedding unit for including into the bitstream the PCM quantization parameter.

BRIEF DESCRIPTION OF THE DRAWINGS

The accompanying drawings are incorporated into and form a part of a specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein:

FIG. 15A is a schematic drawing illustrating samples used by the deblocking filtering and samples modified by the deblocking filtering;

FIG. 15B is a schematic drawing illustrating samples used by the deblocking filtering and samples modified by the deblocking filtering;

FIG. 34 shows an example of a look-up table in which video data standards are associated with driving frequencies.

DETAILED DESCRIPTION OF THE INVENTION

The present invention is based on observation that turning on or turning off all the filters in the loop at once may lead to deteriorating the subjective image quality in some cases. In particular, the application of the deblocking filter may be beneficial in scenarios different from those in which the application of adaptive loop filter and/or sample adaptive offset may be advantageous.

In particular, in the case that a PCM coded block is adjacent to a block coded in another way, deblocking filter may be beneficial. The deblocking filter in such a case smoothes the signal at the boundary region of the two blocks and thus improves the subjective quality even when some noise is introduced into the PCM coded block. However, the quality of the PCM coded block could be reduced in the regions where the block is not applied deblocking filter to, but is applied an adaptive loop filter and/or a sample adaptive offset to. The adaptive loop filter and the sample-adaptive offset may introduce additional noise and/or artifacts.

In accordance with the present invention, the application of the deblocking filter to the PCM coded samples is controlled individually and separately from controlling the application of other filter(s). Accordingly, the present invention enables for further reduction of the undesired quantization noise and may lead to further improving the image quality.

Figure 1:
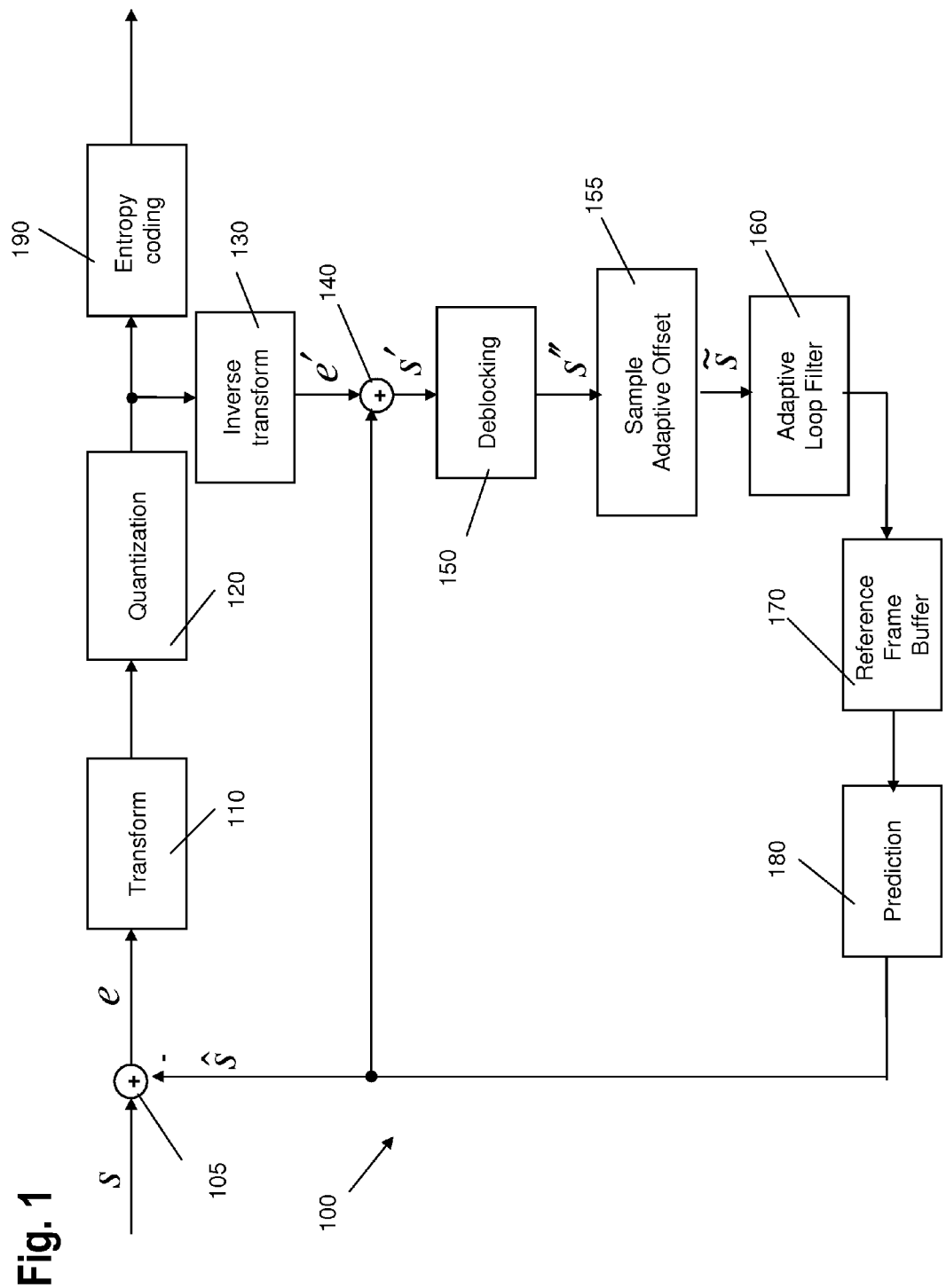
FIG. 1 is a block diagram illustrating an example of a video encoder.
Figure 2:
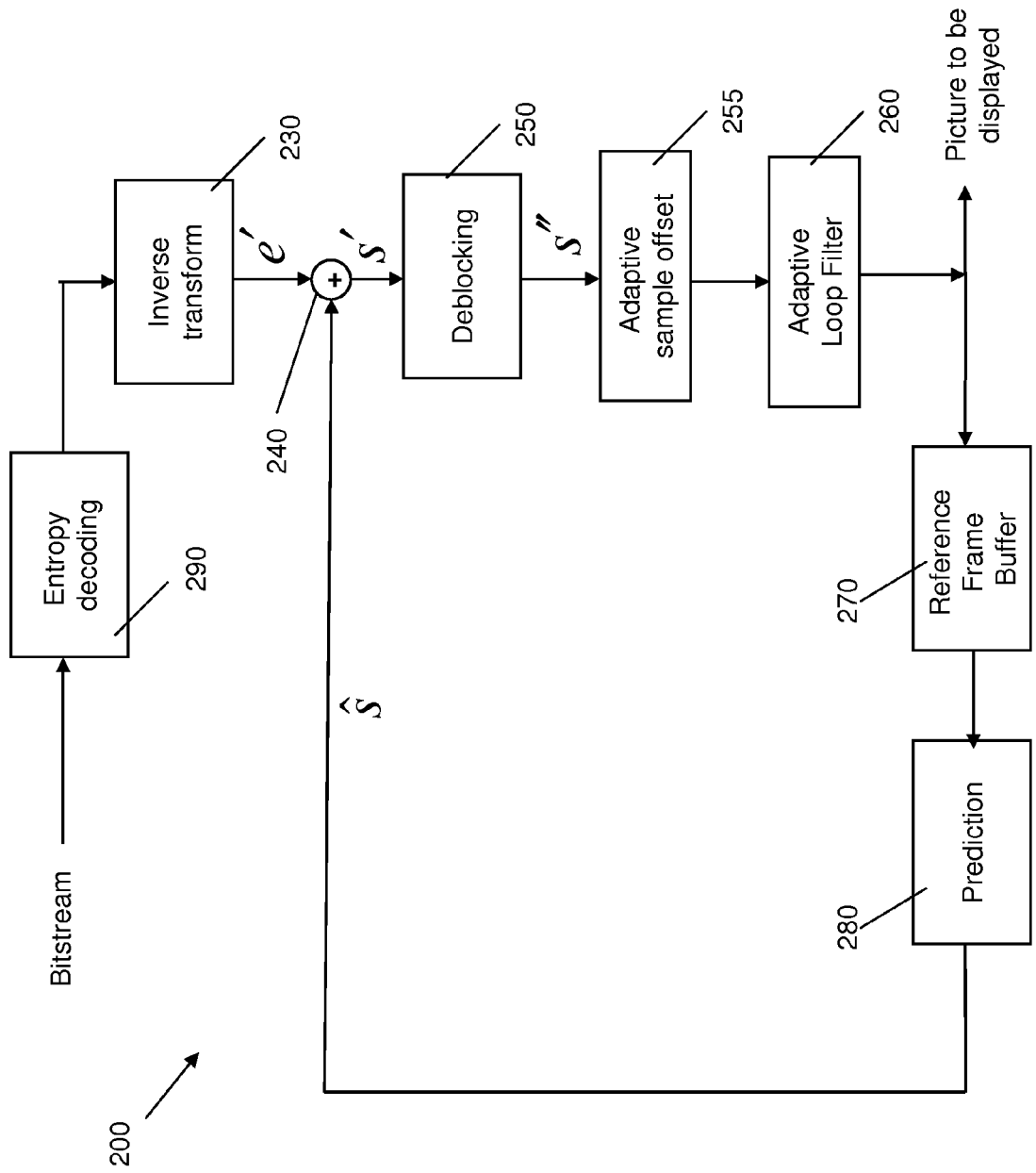
FIG. 2 is a block diagram illustrating an example of a video decoder.
Figure 3:
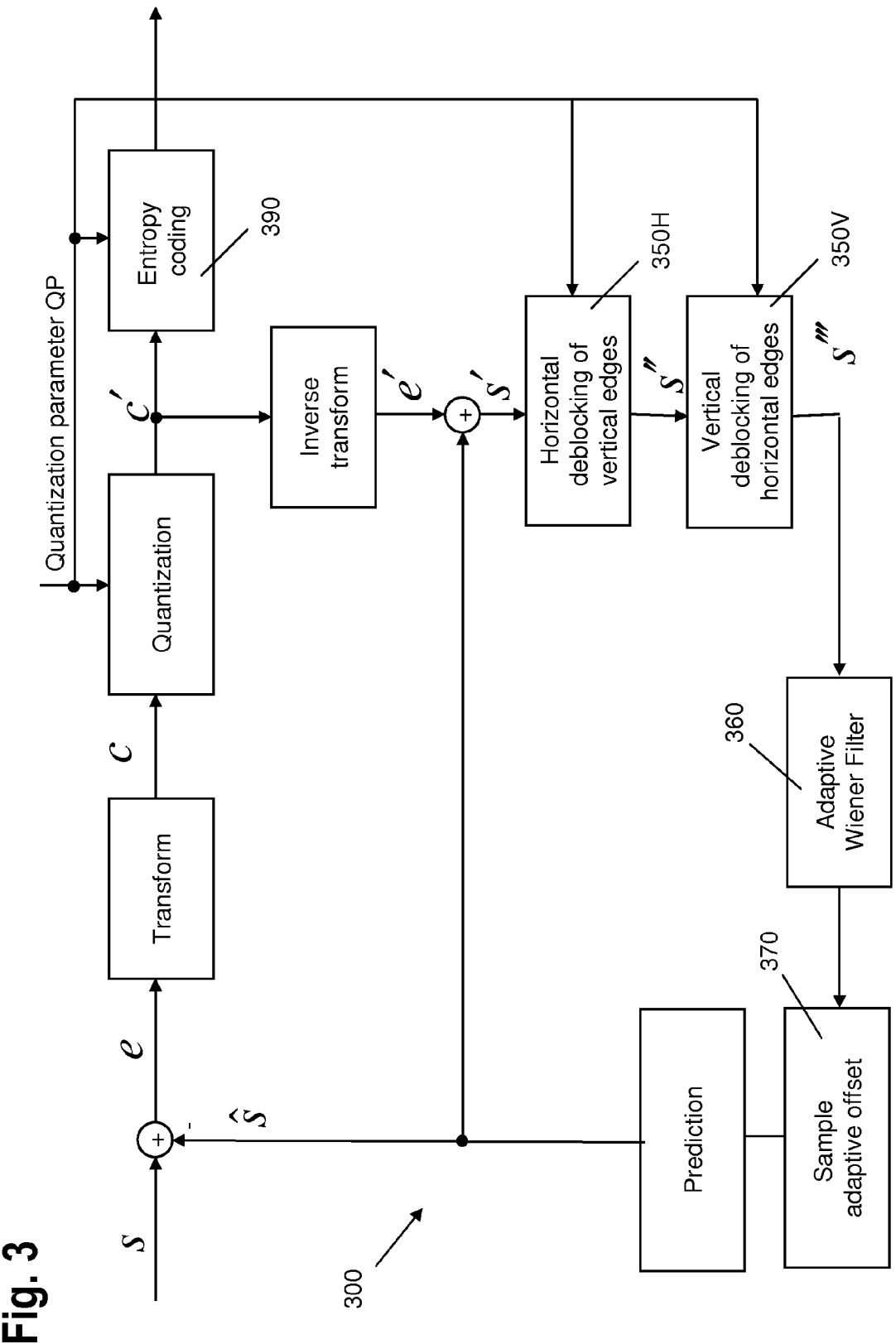
FIG. 3 is a block diagram illustrating an example of a video encoder with separated vertical and horizontal filtering.
Figure 4B:
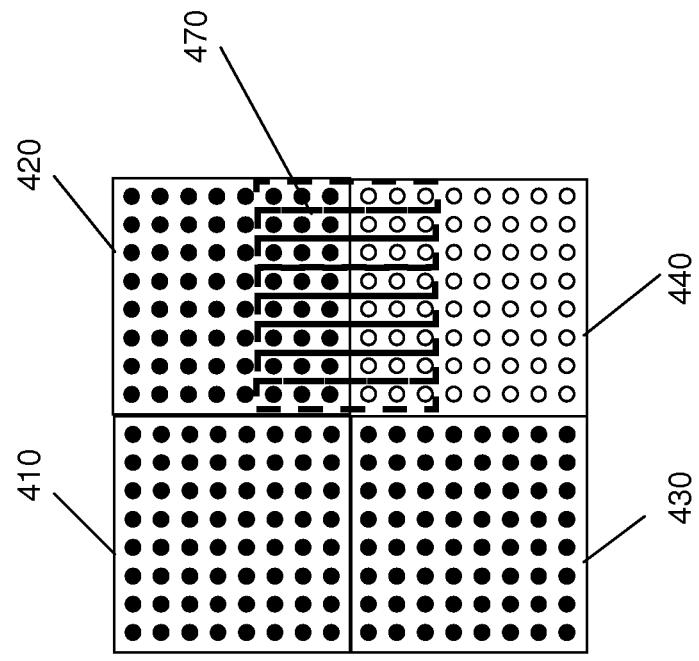
FIG. 4B is a schematic drawing illustrating application of vertical deblocking filtering.
Figure 4A:
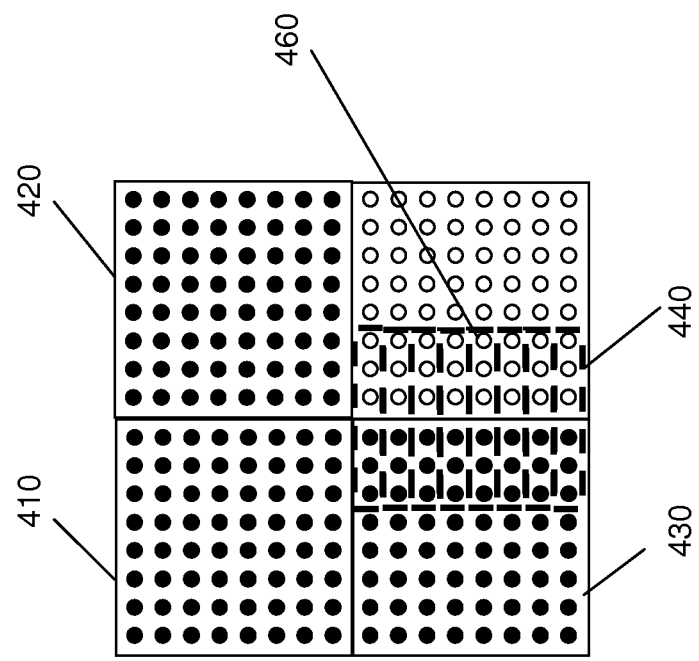
FIG. 4A is a schematic drawing illustrating application of horizontal deblocking filtering.
Figure 5:
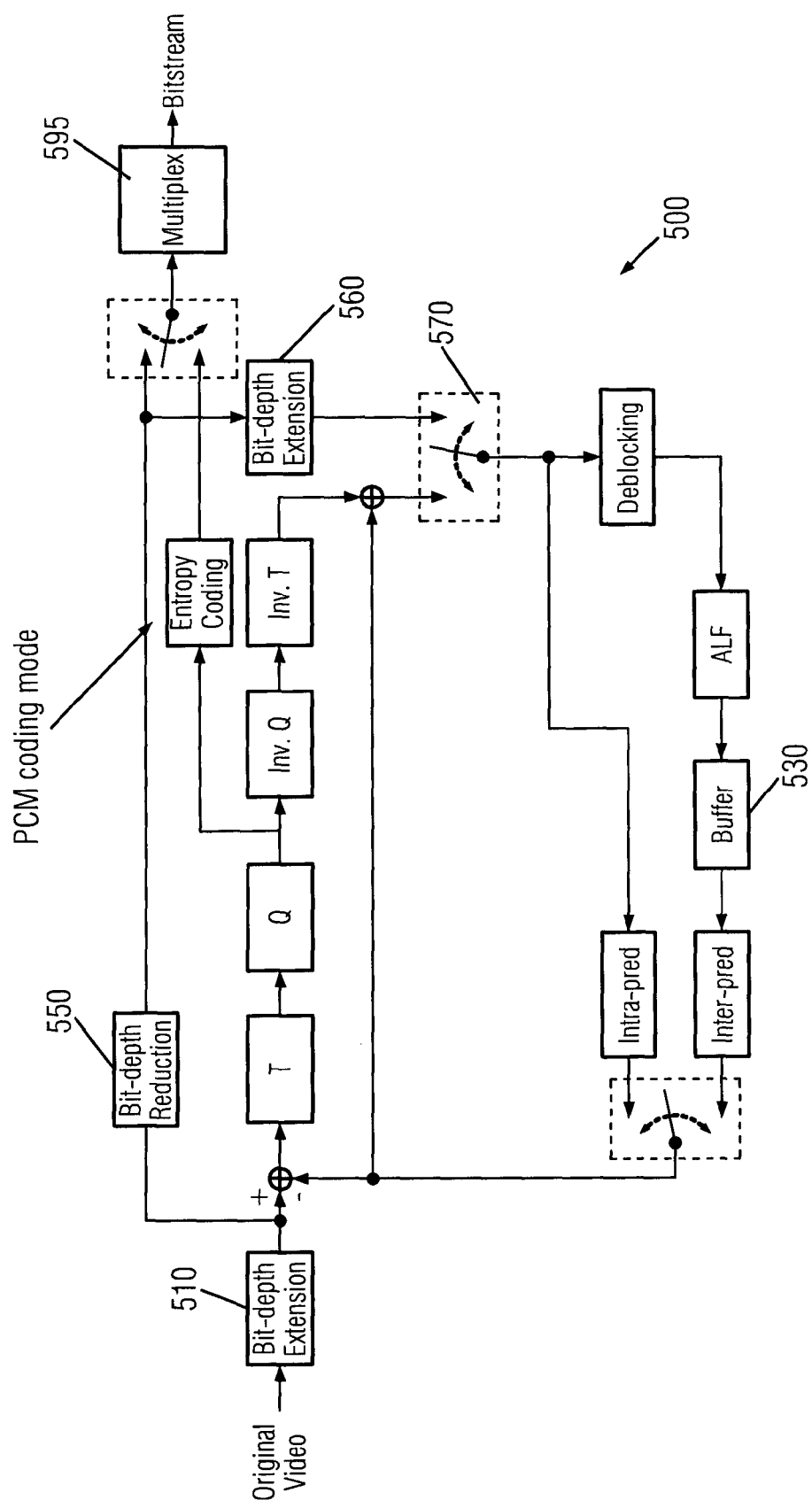
FIG. 5 is a block diagram illustrating an encoder including PCM coding mode with bit-depth reduction.

FIG. 5 illustrates an encoder 500 which basically corresponds to the encoder illustrated in FIGS. 1 and 3. In addition, a PCM coding mode is introduced as shown, for instance in a contribution JCTVC-D0044 "Pulse code modulation mode for HEVC". In particular, bit depth extension 510 may be applied to the original video signal in order to enable coding operations with a higher precision. If the video signal is to be coded by the PCM coding mode, the bit depth is reduced 550 again and the signal is directly output to the multiplex 595 for being included into the bit stream. Switch 570 switches between the input from the PCM coding mode or the prediction and transform coding. Accordingly, the PCM coded samples pass through the deblocking filter ("Deblocking" in FIG. 5) and the other loop filter(s) ("ALF" in FIG. 5) to be buffered 530 for further use as reference samples.

Figure 6:
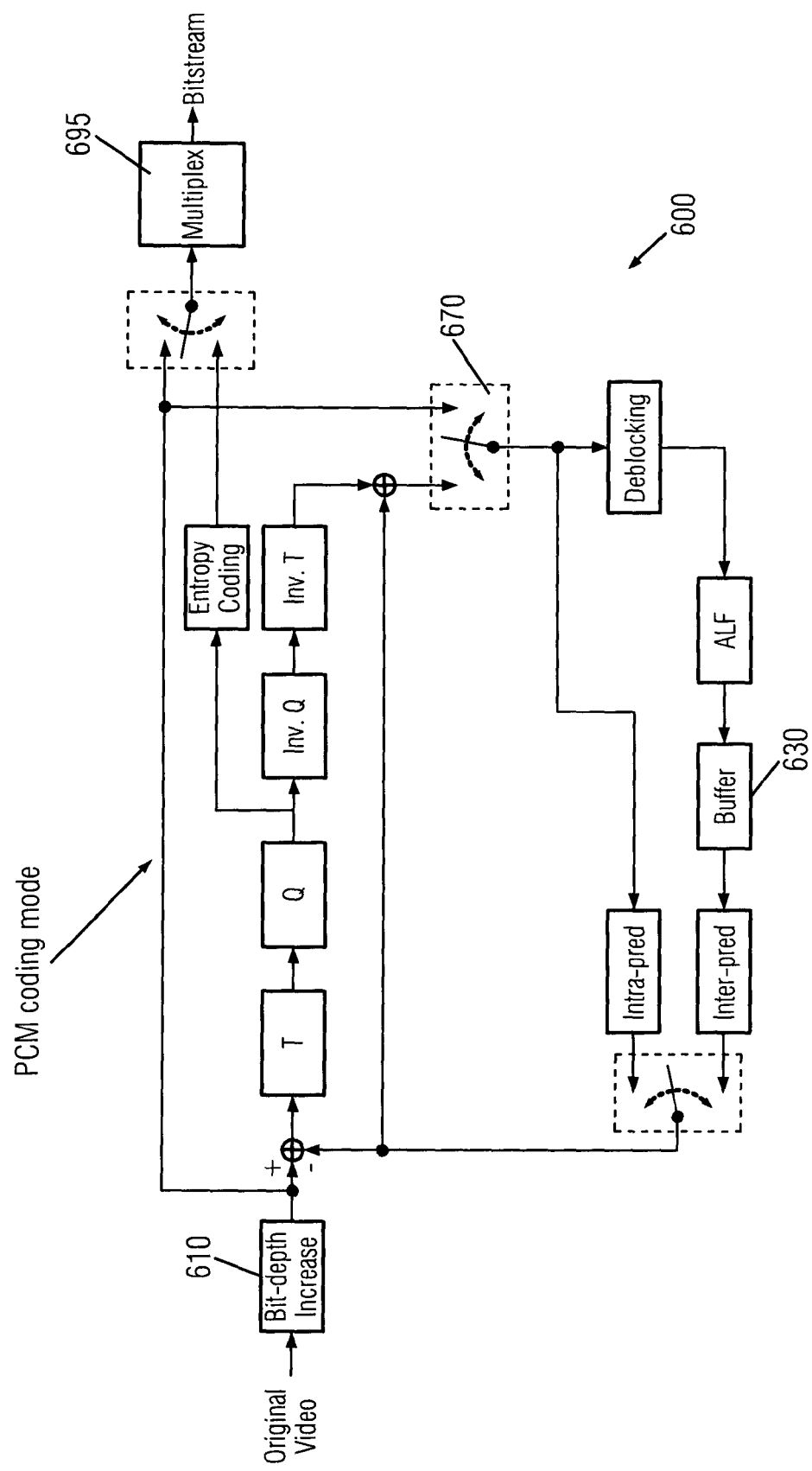
FIG. 6 is a block diagram illustrating an encoder including PCM coding mode without bit-depth reduction.

FIG. 6 illustrates an alternative implementation of PCM coding mode according to JCTVC-E057 "Pulse code modulation mode for HEVC". In particular, after the bit depth increase 610 the PCM samples are directly provided to the multiplexer 695 for being included into the coded bit stream. Switch 670 switches between the PCM coding mode samples or prediction/transform coding mode samples. The PCM coded samples or prediction/transform coded samples undergo deblocking filtering and adaptive loop filtering and may also undergo sample adaptive offset filtering. Then the possibly filtered samples are stored in the buffer 630 for further use as reference samples.

In case the PCM samples do not include any quantization error, the application of the filtering such as deblocking filtering, adaptive loop filtering or sample adaptive offset may lead to introducing additional noise to the image signal. Therefore, JCTVC-E192 contribution suggests switching on or switching off the filtering.

Figure 7:
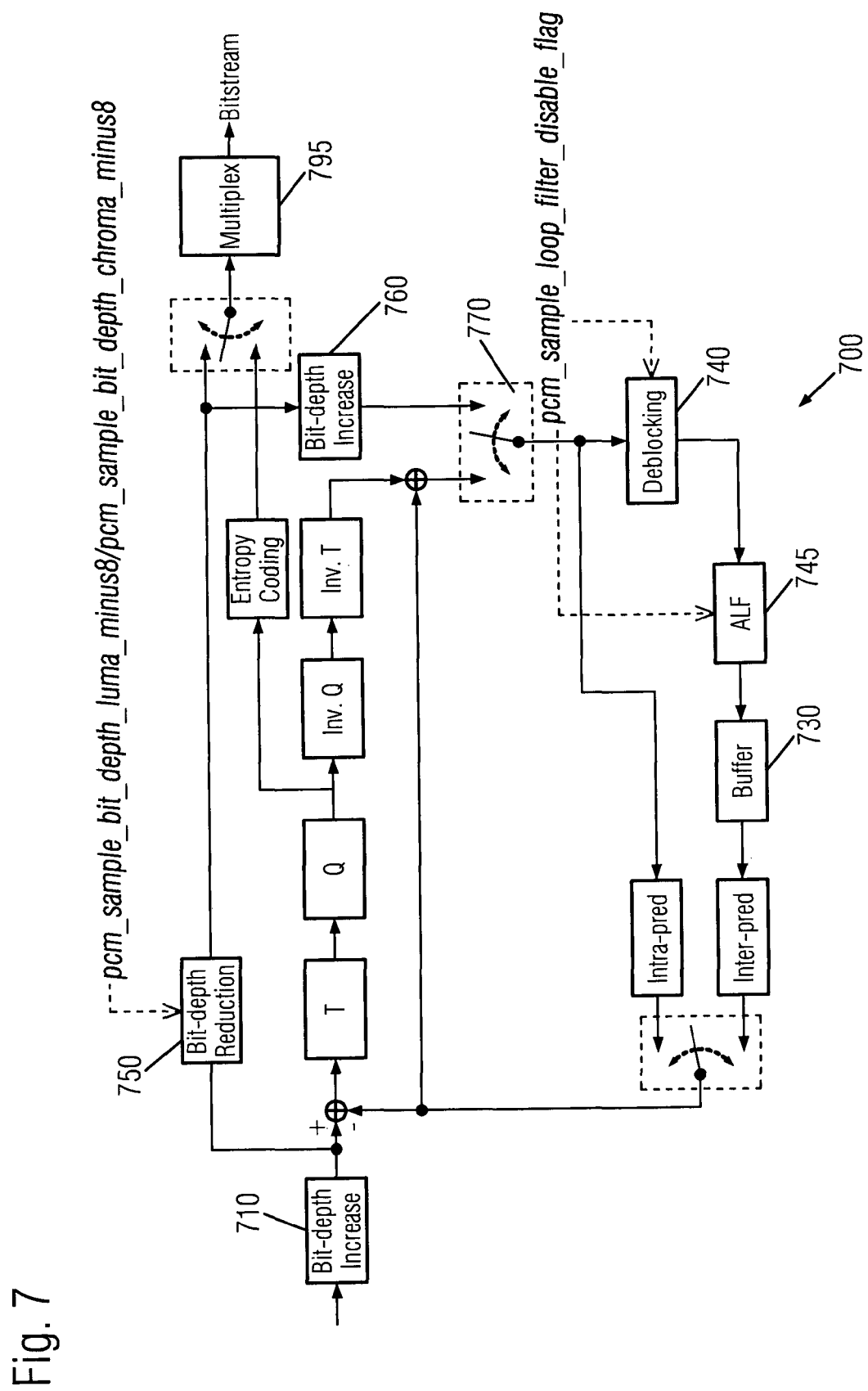
FIG. 7 is a block diagram illustrating an encoder including PCM coding mode with a switch to switch on/off the filtering.

FIG. 7 illustrates a possible implementation of an HEVC compliant encoder supporting PCM coding mode and switching filtering on or off. In particular, original video signal is input to the unit 710 for increasing the bit depth. If the coding mode is a PCM coding mode, in the bit depth reduction unit 750, the PCM samples are reduced to a predetermined bit depth. At the same time, the predetermined bit depth is signaled within the bit stream. Parameter PCM_sample_bit_depth_xxx_minus8 in which "xxx" may indicate luminance or chrominance samples ("luma", "chroma") controls the big depth of the resulting PCM signal which is then provided to the multiplexer 795 for being included (embedded) into the bit stream. For the purpose of buffering the samples as reference samples for further use by predictive coding, the bit depth of the PCM coded samples is increased 760. Via the switch 770 the PCM samples are then input to the deblocking filtering unit 740 and a second filtering unit 745 (in this case adaptive loop filter unit) and finally stored in the buffer 730. In accordance with the contribution JCTVC-E192, a switch for switching-on or switching-off the loop filtering such as deblocking filtering 740 and other-type loop filtering 745 is provided. The switch value (on/off) may then be included into the bit stream and signaled to the decoder in order to enable similar operation of the decoder and encoder. The switching (controlled by the indicator, which may be a flag) is illustrated in FIG. 7. In particular, the parameter PCM_sample_loop_filter_disable_flag is signaled within the SPS NAL unit to enable or disable both adaptive loop filtering 745 and deblocking filtering 740.

The purpose of the in-loop filters, namely of the deblocking filter and the adaptive loop filter, is to correct distortion associated with a lossy compression. However, when the original uncompressed samples are coded using the PCM coding mode, then the samples are distortion free. Therefore, the in-loop filtering process should conceptionally be disabled as shown in FIG. 7. On the other hand, some encoder implementations may code non-original (reconstructed) samples as PCM samples. In such a case, these PCM samples may indeed include quantization noise. Consequently, performing in-loop filtering may be useful since it may improve the resulting image quality. Therefore, JCTVC-E192 enables switching on or switching off the in-loop filtering. However, such a switch may not be enough in order to avoid quality reduction caused by applying or not applying the filtering.

Figure 8:
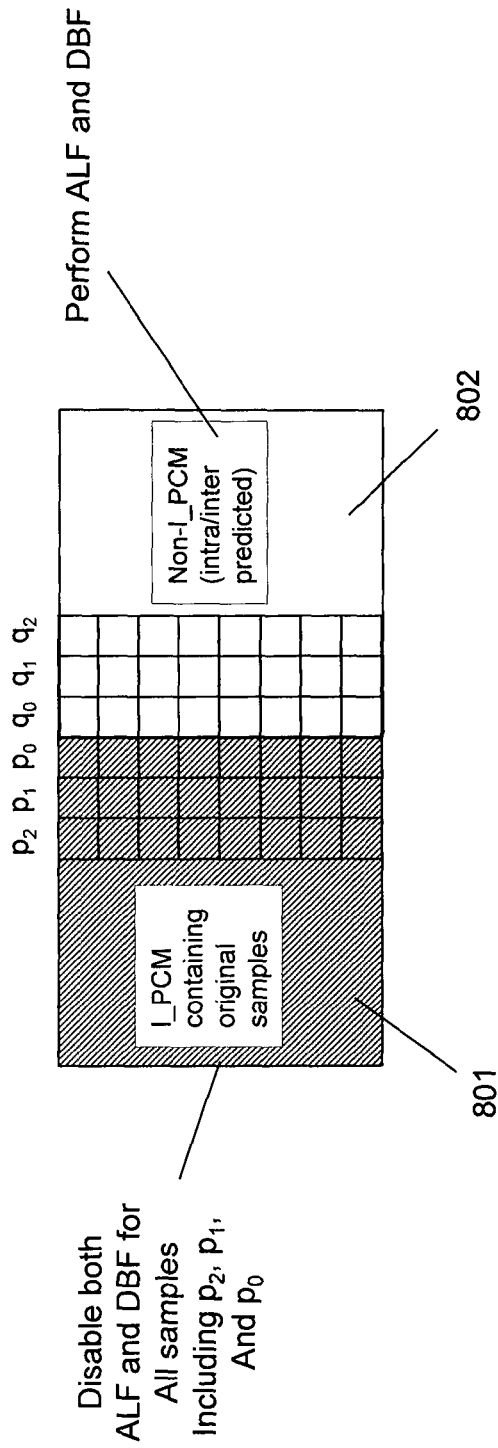
FIG. 8 is a schematic drawing illustrating an example of enabling/disabling the filtering for PCM-coded and non-PCM-coded blocks.

FIG. 8 illustrates two blocks in 801 and 802 wherein block 801 is coded by the PCM coding mode and includes original video samples denoted I_PCM. Block 802 includes predicted samples which are coded using intra or inter prediction and denoted s non-I_PCM samples. Samples $p_2$, $p_1$, $p_0$, $q_0$, $q_1$ and $q_2$ are boundary pixels situated at the boundary between the blocks 801 and 802 in one of the lines indicated in FIG. 8 by the 8×6 grid. When the proposal of JCTVC-E192 is applied in this scenario, the adaptive loop filtering and deblocking filtering for block 801 are both disabled. This means that pixels $p_0$, $p_1$, and $p_2$ are not filtered. In contrast, adaptive loop filtering and deblocking filtering may be both enabled for block 802. In such a case, the block boundary may become visible after decoding and include blocking artifacts since it is not smoothed in the part of block 801. It is noted that in the above examples deblocking filtering and adaptive loop filtering were described. However, same also applies to sample adaptive offset which may be performed before or after the adaptive loop filtering or even without adaptive loop filtering.

In order to overcome the quality reduction, the present invention signals enabling or disabling the deblocking filter individually and separately from enabling or disabling other filters such as adaptive loop filter or sample adaptive offset.

In accordance with an advantageous embodiment of the present invention, the application of each noise reducing filter is controlled individually for the PCM coded blocks. This may be implemented by one flag that is coded and transmitted for each individual noise reducing filter, the flag indicating the application of the filter for the PCM coded block. In case of three filters the deblocking filter, SAO, and adaptive loop filter as shown in FIGS. 1 and 3, three individual flags may be used.

However, the present invention is not limited thereto and one flag may be used to control deblocking filtering and another flag may be used to control commonly the remaining filterings such as adaptive loop filter and sample adaptive offset.

Figure 9:
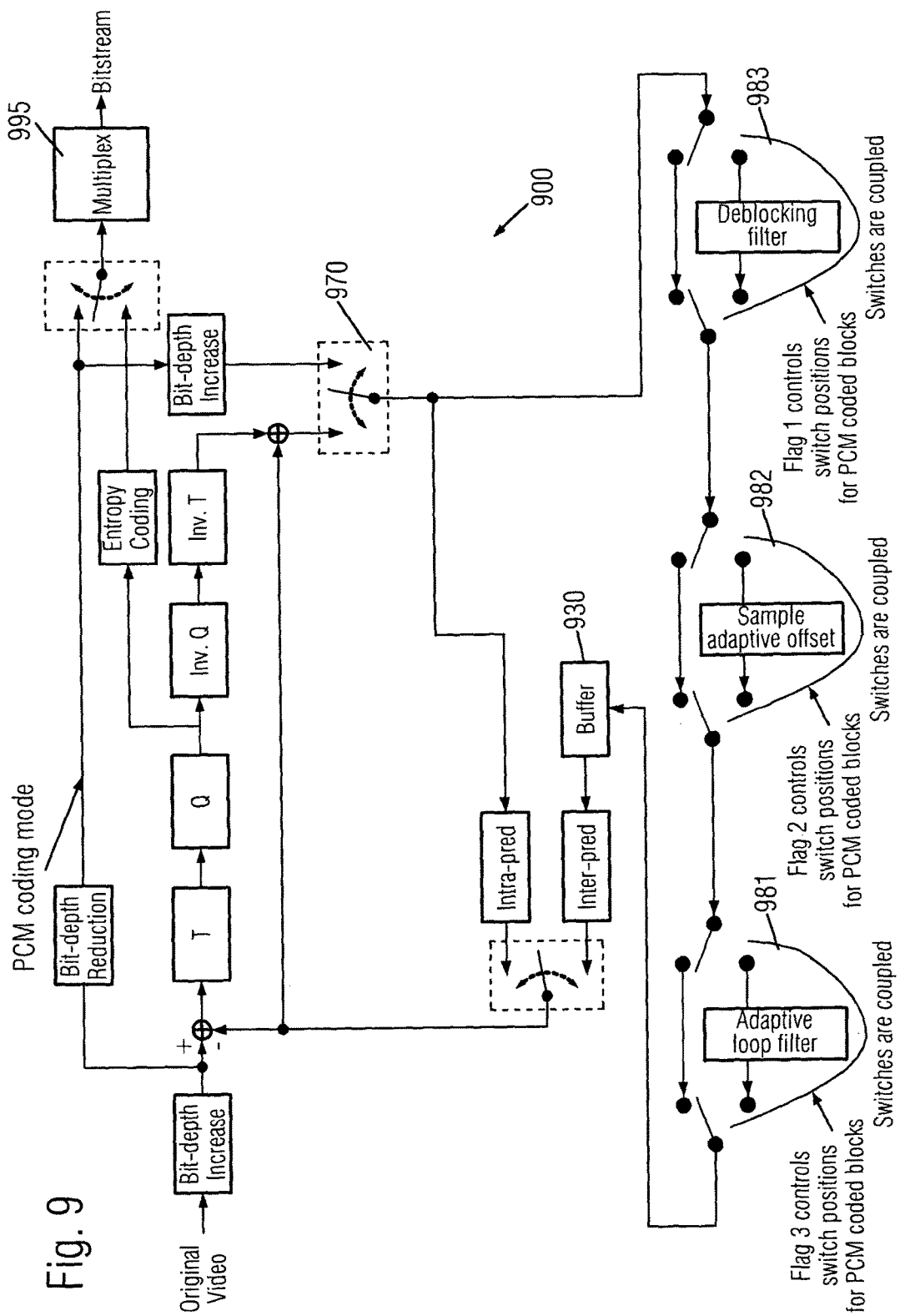
FIG. 9 is a block diagram illustrating encoder with individual switching on/off of different filters according to an embodiment of the present invention.

FIG. 9 illustrates an example of video encoder 900 including individual switches 981, 982, and 983 for switching on or off the respective adaptive loop filter, sample adaptive offset, and deblocking filtering. The switch positions may be coded as respective flags which are transmitted within the bit stream in order to enable controlling the decoder to perform the filtering in the same way as the encoder.

It may be further advantageous to control the application of the individual filters for PCM coded blocks separately for the samples which can be modified by the deblocking filter and the samples which are not modifiable by the deblocking filter. Such a control may be achieved by providing an additional indicator (flag) which is coded and transmitted within the bit stream together with the coded image data. By controlling separately the samples modified and not modified by the deblocking filter, a finer adaptation of the filtering is achieved. In particular, in case when the deblocking filtering is not applied to PCM coded samples, the adaptive loop filter or sample adaptive offset may introduce additional noise to those samples. In general, the deblocking filter is applied to the image signal in order to improve the subjective quality at the block boundaries. When deblocking filtering was applied, the sample adaptive offset and the adaptive loop filtering may further be beneficial in order to improve the objective image quality.

Moreover, for the PCM coded blocks, adaptive loop filtering as well as SAO offset may also be switched on or off based on the result of the deblocking filter decision. In particular, if the deblocking introduces noise, this noise may be reduced by the subsequently applied adaptive loop filtering and/or sample adaptive offset. If it is decided that no deblocking filter is applied, no noise is introduced and therefore, adaptive loop filtering and/or sample adaptive offset would introduce additional noise. In such a case, it may be better to switch the further filtering off.

Figure 10A:
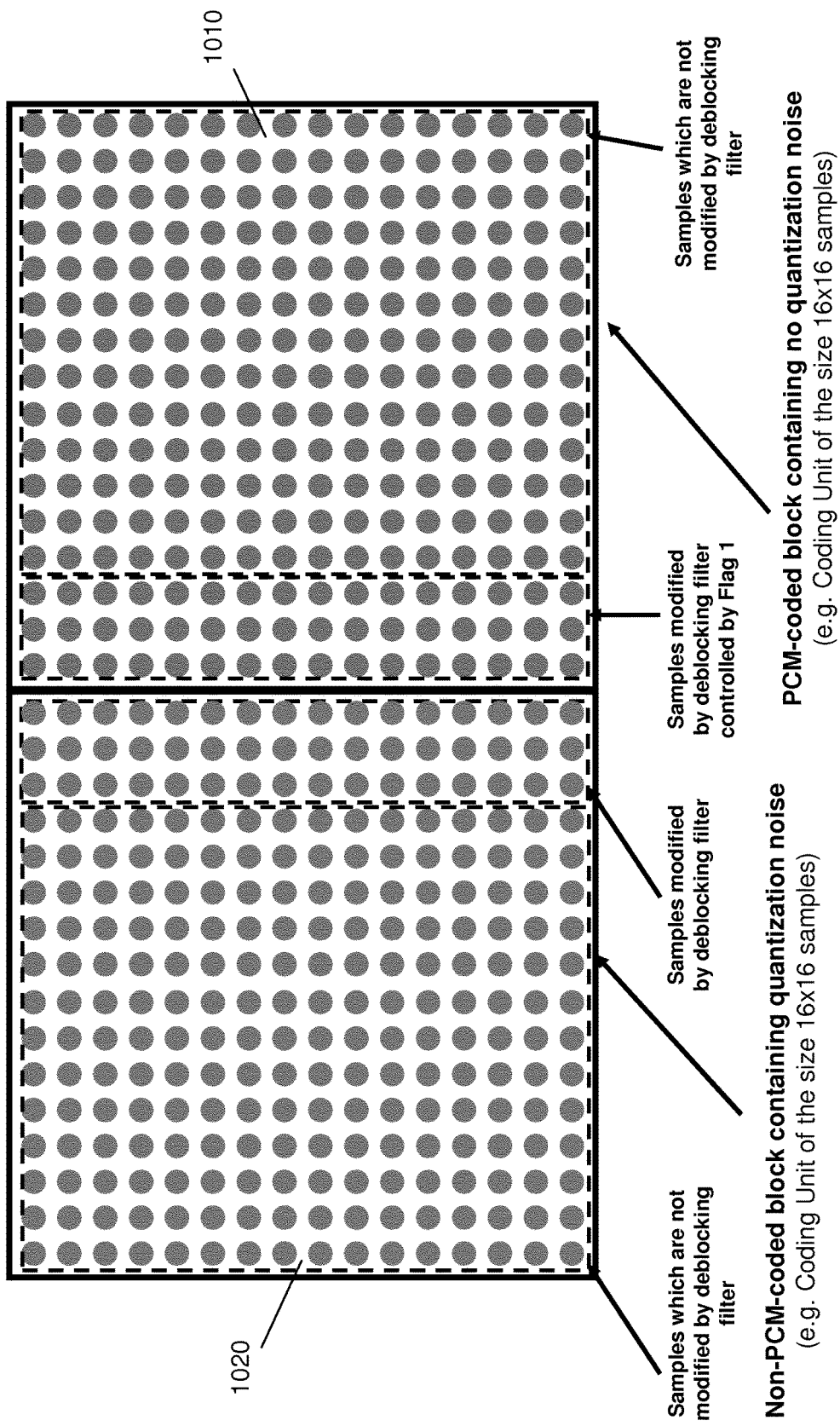
FIG. 10A is a schematic drawing illustrating regions which can be modified by the deblocking filter.
Figure 10B:
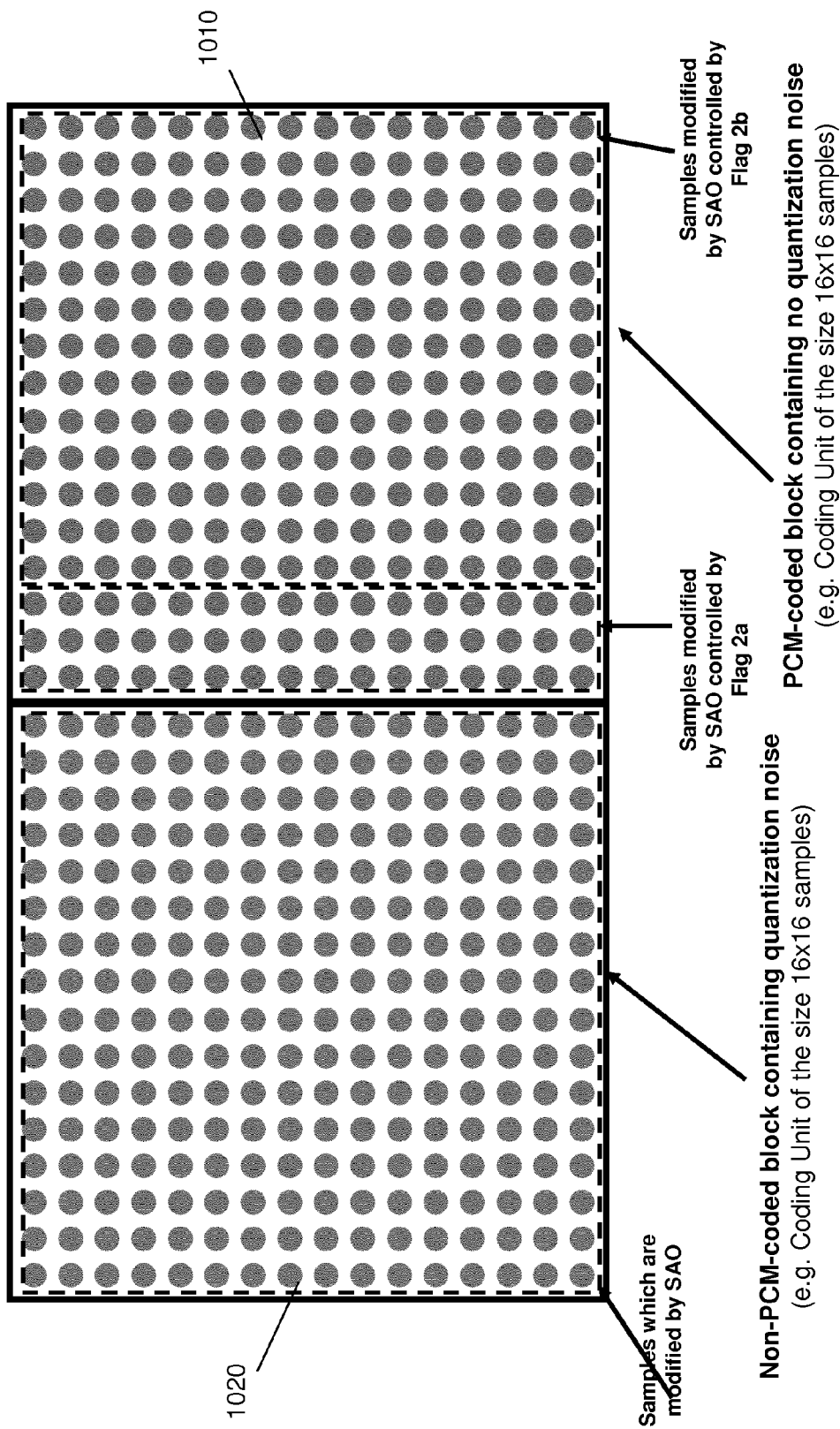
FIG. 10B is a schematic drawing illustrating switching on/off sample-adaptive offset application for regions which can be and cannot be modified by the deblocking filter.

FIGS. 10A, 10B and 100 illustrate an example according to the present embodiment. In particular, it is decided for a current block 1010 separately whether deblocking filter is to be applied to its pixels and whether another filter is going to be applied to this block. It is decided individually for samples which are modified by the deblocking filter and for the other samples (which are not modified by the deblocking filter) whether a subsequent filtering should be applied or not. Separate flags are then used to indicate application of filtering to the modified and to the non-modified block samples.

FIG. 10A shows the current block 1010 and a block 1020 adjacent to the current block to its left. In this example it is assumed that the respective three pixels closest to the boundary between the two blocks may be modified by the deblocking filtering. Dashed rectangles in FIG. 10A illustrate samples which are modified by deblocking filter and samples which are not modified by the deblocking filter in the neighbouring blocks 1010 and 1020. It is assumed that the current block 1010 is a PCM coded block without any quantization noise. On the other hand, block 1020 is a non-PCM coded block which contains quantization noise. In this example, the blocks are coding units having size of 16×16 samples. An individual flag ("flag 1") indicates whether deblocking filtering is applied to the current block 1010 or not. If the deblocking filtering is applied, only the samples in the proximity of the block boundary are modified (modifiable samples). It is noted that in FIG. 10 only horizontal deblocking filtering region is shown. However, the present invention is not limited thereto and applies similarly to the vertical filtering across the horizontal block boundaries.

FIG. 10B illustrates same blocks 1010 and 1020 wherein the sample adaptive offset is applied to the adjacent block 1020, for instance to all 8×8 samples. The application of the sample adaptive offset to the current block 1010 is decided in this embodiment individually for the samples modified by the deblocking filter and samples not modified by the deblocking filter. Correspondingly, two flags ("flag 2a", "flag 2b" in FIG. 10B) may be included into the bit stream for specifying whether sample adaptive offset is to be applied to the area modifiable by the deblocking filter and whether the sample adaptive offset is to be applied to the area not modifiable by the deblocking filter.

Figure 10C:
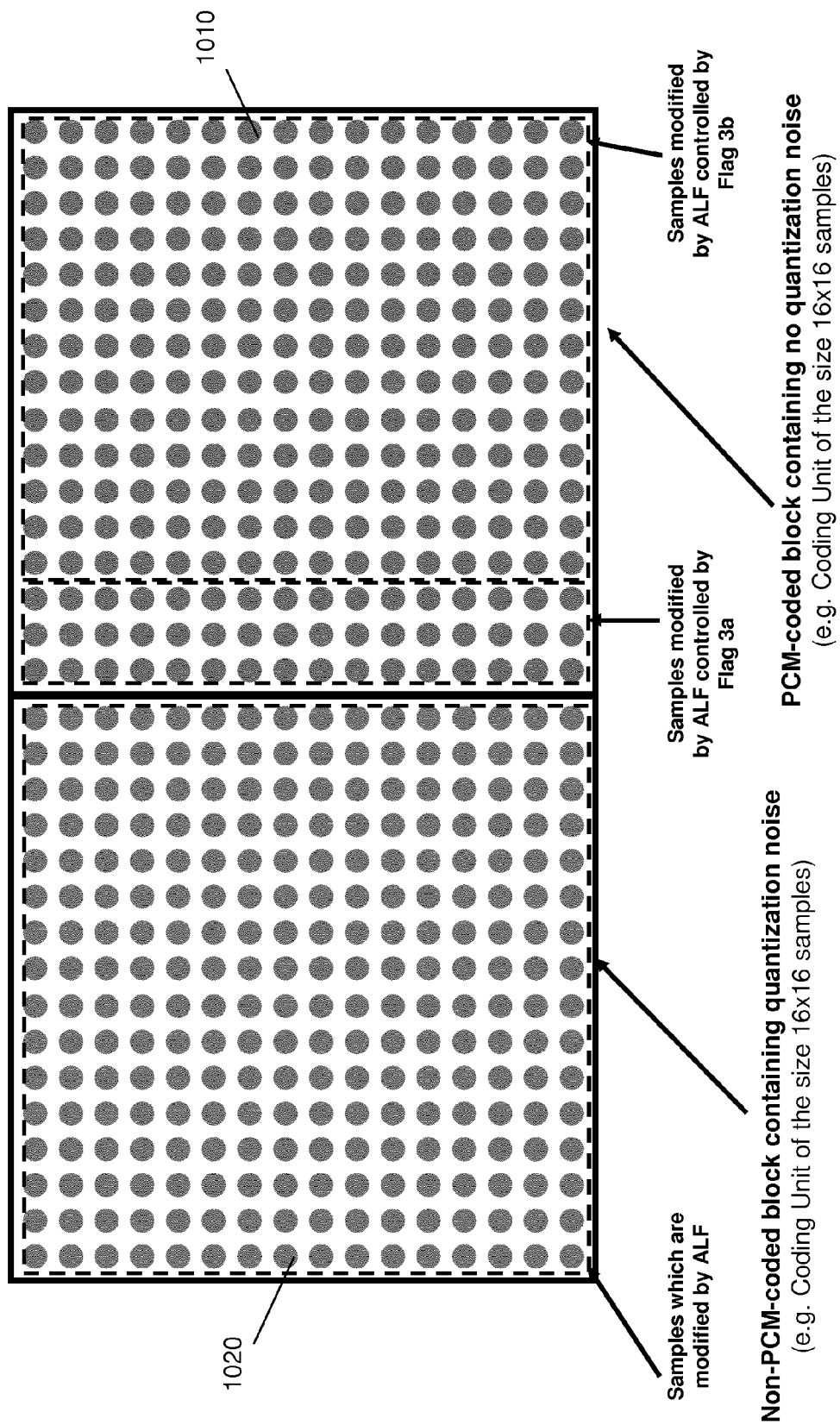
FIG. 10C is a schematic drawing illustrating switching on/off adaptive loop filter application for regions which can be and cannot be modified by the deblocking filter.

FIG. 10C illustrates the same blocks 1010 and 1020 and the application of the adaptive loop filter to the samples modified by the deblocking filter and to the samples not modified by the deblocking filter. Similarly as in the case of an application of the SAO, two flags ("flag 3a", "flag 3b" in FIG. 10C) may be included into the bit stream for indicating separately and individually for region of the current block modified by the deblocking filter and region of the current block not modified by the deblocking filter whether adaptive loop filter is to be applied thereto.

In accordance with the present invention, the filtering of the PCM coded blocks may be controlled separately for different filter types such as deblocking filter, sample adaptive offset, and adaptive loop filter. The order of application of these filters is immaterial to the present invention and may be selected arbitrarily. The indicators may be binary flags which can take value of 0 or 1, indicating whether the filtering is to be applied or not, respectively. These flags may be inserted into the bit stream at different positions. Advantageously, the flags are inserted into the slice header and apply for all blocks included in the slice. However, the present invention is not limited thereto and the indicators may be inserted via packets containing SPS, PPS, or APS. For a particularly fine adjusting of filtering, the flags may be signaled on a per coding unit basis. The indicators (flags) indicate the position of the switches for switching on or off the filtering, possibly for a particular block sub-region. For instance, the position of the switches may be coded directly after the coding of the information that the block is coded in the PCM mode.

In order to improve the reconstruction quality of the video signal, the boundaries between the PCM coded blocks and the neighbouring blocks may be deblocked if the quantization error of the neighbouring block is considered to be high.

This may be tested by employing a predetermined threshold. For instance, the quantization error may be considered to be high when the quantization parameter value of the neighbouring block exceeds the predetermined threshold. This threshold may be either fixed or adaptive, for instance coded within the bit stream together with the coded data.

Instead, or in addition to the indicator for enabling or disabling the deblocking filtering, a quantization parameter value $QP_{PCM}$ may be included into the coded bit stream. This PCM quantization parameter indicates the quantization amount employed for adjustment of the deblocking filter for the PCM coded blocks. The PCM quantization parameter may be determined as a characteristic of the original video signal input to the PCM coding. For instance, the PCM quantization parameter may depend on the bit depth of the PCM samples.

In order to enable adaptive selection of the deblocking or other filtering, the $QP_{PCM}$ may be determined at the encoder (since the encoder knows the original video signal) by optimization. For instance, different values of $QP_{PCM}$ may be tested and the resulting subjective video quality is evaluated. The value which leads to the highest subjective quality is then taken as $QP_{PCM}$. It is noted that the subjective quality may be tested by calculating a subjective video quality metric. There are a lot of different metrics defined for the estimation of the subjective video quality. In general, the present invention is not limited by any particular metric.

Alternatively, the $QP_{PCM}$ may be estimated. At the encoder, a mean square error is measured for the PCM coded blocks. Then an equivalent quantization parameter is estimated, which would result to the same mean square error if transformation coding was used. The so obtained equivalent $QP_{PCM}$ is then used.

However, the above examples of obtaining the parameter $QP_{PCM}$ are not exhaustive and for the purpose of the present invention, any parameter indicative of the presence of noise in the PCM coded block may be employed.

Figure 11:
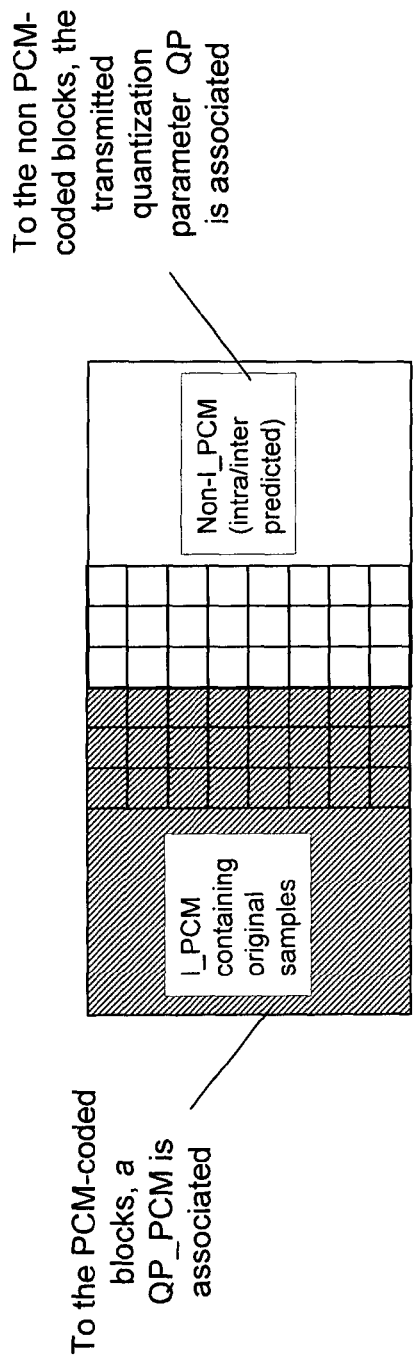
FIG. 11 is a schematic drawing illustrating an example of a PCM-coded and a non-PCM coded adjacent blocks and their characterizing quantization parameter.

FIG. 11 illustrates two neighbouring blocks, one of them being coded by the PCM coding mode and the other one being coded by a non-PCM coding mode such as intra or inter predicted mode described in the background section above. For the non-PCM coded blocks, the quantization parameter is typically signaled, which is applied to the transformed prediction error in order to enable lossy compression.

The PCM coded blocks are not quantized. Rather, the samples are assigned a predefined number of bits, called bit depth. The PCM coded signal, however, may originate from a video sequence which has been quantized before and may still contain quantization noise or other noise or artifacts. In accordance with an aspect of the present invention, the application of the deblocking filtering to the PCM coded samples is performed as a function of the "PCM quantization parameter" $QP_{PCM}$ and the quantization parameter of the non-PCM block. For instance, an average quantization parameter $QP_{AVE}$ may be calculated as follows:

$$QP_{Ave}=(Q_{PCM}+QP)>>1$$

Wherein the operation ">>1" indicates right shift by one bit. The shift corresponds to integer division by two. In accordance with the calculated average quantization parameter $QP_{AVE}$ the adjustment of the deblocking filter may be performed. For instance, it may be decided whether a deblocking filter is to be applied or not to the PCM coded block. This can be performed by comparing the average quantization parameter with a predetermined threshold. This threshold may be a fixed threshold or an adaptive threshold signaled within the video sequence. The threshold may be obtained by applying an optimization based on test images or by an optimization based on the already coded image signal.

Alternatively or in addition, the deblocking filter may be selected based on a function of the PCM quantization parameter and the quantization parameter of the adjacent block. In particular, the strength (frequency response, filter coefficients) of the applied deblocking filter may be selected. As an alternative or as an additional selection criterion it may be decided which of the samples (how many samples) at the boundary of the current block are to be filtered.

The PCM quantization parameter $QP_{PCM}$ may be coded using predictive coding. The prediction may be for instance the slice quantization parameter or the quantization parameter of the previously coded blocks. The $QP_{PCM}$ coding may also be performed based on the bit depth of the PCM coded block or blocks wherein the bit depth may be coded and transmitted (embedded into the bitstream). The coded PCM quantization parameter may be inserted into a header of a slice, a picture, a picture sequence etc. However, it may also be inserted into another parameter set such as the adaptation parameter set (APS) or PPS or SPS.

The PCM quantization parameter $QP_{PCM}$ may also be derived based on the bit depth of the PCM coded blocks.

Figure 12:
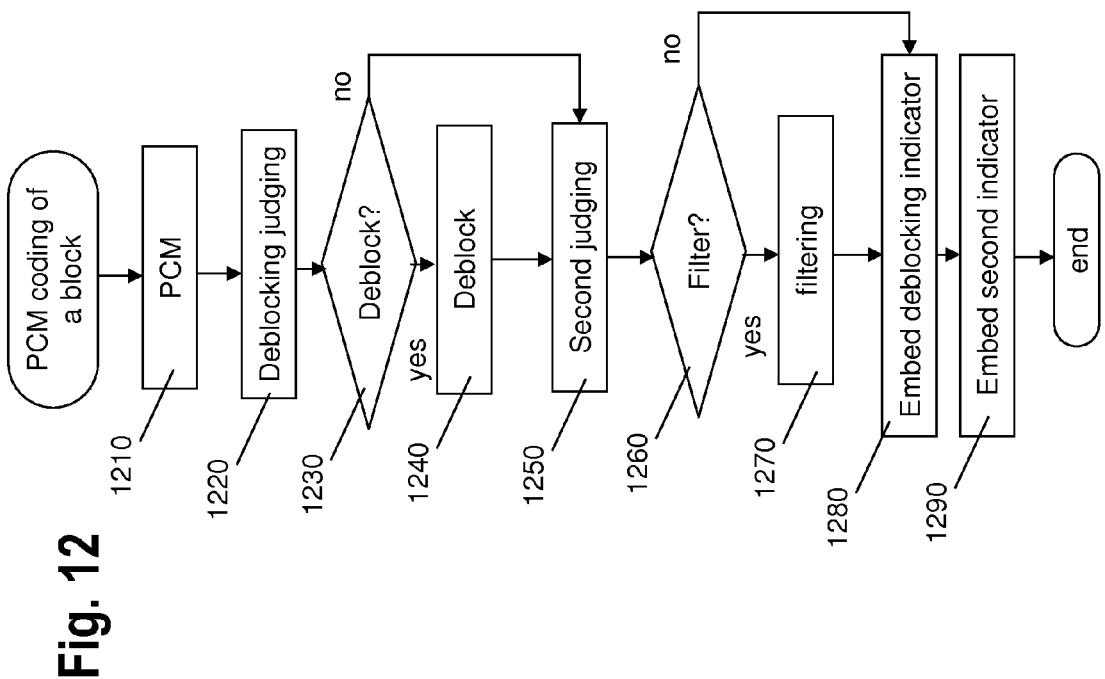
FIG. 12 is a flow diagram illustrating an example of an encoding method using deblocking filtering in accordance with an embodiment of the present invention.

FIG. 12 shows an example of a coding method for coding a block of samples in an image of a video signal into a bit stream in accordance with an embodiment of the present invention. In particular, the input block is coded 1210 using PCM. Accordingly, each sample is represented by a PCM symbol. PCM symbols are binary symbols with a fixed bit-length, for instance 8 bits per sample. However, any other lengths such as 6, 7, 9, 10, etc. bits per sample may be used. The PCM coding may include increasing or decreasing the bit depth of the original input image signal. If the input image signal is already in the desired bit depth, no further operation is necessary. The PCM coded block of samples is then passed to a decision whether filtering is to be applied to it or not.

In particular, it is judged 1220 whether a deblocking filter is to be applied to the PCM coded block of samples or not. When it is judged 1220 that the deblocking filter is to be applied ("yes" in step 1230) the PCM block is deblocked 1240. In case it is judged 1220 that no deblocking filtering is to be applied ("no" in step 1230), the block is not filtered by the deblocking filter. It is noted that separate decisions may be applied to vertical and horizontal filtering depending on the characteristics of the vertically and horizontally neighbouring blocks. After the decision and possible application of the deblocking filtering it is judged 1250 whether a second filter, which is different from the deblocking filter, is to be applied to the current block of samples. If it is judged that the second filter is to be applied ("yes" in step 1260), the second filter is applied 1270 to the current block. In case it is judged that a second filter is not to be applied ("no" in step 1260) the second type filter is not applied. In accordance with the judgment 1220 and 1250, two indicators are embedded into the bit stream. First, a deblocking filter indicator is included 1280 into the bit stream for indicating the result of the judging whether a deblocking filter is to be applied or not. Then, a second filter indicator is included 1290 into the bit stream for indicating the result of the judging whether a second filter is to be applied or not.

The judging whether a deblocking filter is to be applied to the PCM coded block of samples may further include the step of determining whether an adjacent block to the block of samples is coded using the pulse coded modulation or by predictive/transformation coding. When the adjacent block is coded by predictive coding, it is judged that the deblocking filter is to be applied to the block of samples. Otherwise, it is judged that the deblocking filter is not be to be applied. Here it is assumed that applying of the predictive coding is connected with quantization which could reduce the quality of the adjacent block, i.e. result in introducing quantization noise into the adjacent block. Therefore, the original PCM coded block boundary to such an adjacent block may get more visible causing blocking artifacts which are preferably to be deblocked.

In addition or alternatively, the judging whether a deblocking filter is to be applied to the block of samples is performed based on comparing quantization error of the block adjacent to the block of samples with a predetermined threshold.

A judging whether a second filter is to be applied to the current block of samples may include the step of determining the amount of quantization noise in the PCM coded current block and based on the determined amount of quantization noise judging whether a second filter is to be applied or not to the current block. The quantization noise in the PCM coded block may be estimated, for instance, based on the bit depth used for PCM coding of the samples. Alternatively or in addition, the quantization noise may be estimated based on a prior knowledge of the input image signal. For instance, the input image signal may be a signal reconstructed after a previous quantization. In case this previous quantization amount is known, it may be used to decide whether a second filter is to be applied. The amount of the quantization noise however may be also estimated by using of any available estimation or optimization methods.

The second filter may be one of the adaptive loop filter or a sample adaptive offset. However, it may also be another type of noise suppressing filter. In case the second filter is an adaptive loop filter, the corresponding second indicator may be embedded into the bit stream. In addition, a third filter which may be a sample adaptive offset may also be applied after the judgement and a corresponding third indicator may also be included into the bit stream independently and separately from the indicators concerning the application of the deblocking filter and the adaptive loop filter.

Alternatively, the second filter indicator may be a binary indicator indicating commonly whether both ALF and SAO are to be applied to the block of the samples. If the indicator has value of 0, neither ALF nor SAO is applied. If the indicator has value of 1, both SAO and ALF are applied.

In accordance with an embodiment of the present invention, the step of judging whether a second filter is to be applied to the block of samples further comprises a step of judging whether the second filter is to be applied to those samples of the block which are modifiable by the deblocking filtering. It further comprises the judging whether the second filter is to be applied to those samples of the block which are not modifiable by the deblocking filtering. The corresponding indicators are included into the bit stream. In particular, a modifiable sample indicator is included into the bit stream for indicating the result of the judging whether the second filter is to be applied to the modified samples. In addition, a non-modifiable sample indicator is included into the bit stream for indicating the result of the judging whether the second filter is to be applied to the non-modifiable samples. This embodiment provides an advantage of spatial separation of samples which are modified by the deblocking filter and samples which are not modified by the deblocking filter. In particular, the deblocking filter aims at improving the subjective image quality. However, it may worsen the objective image quality, i.e. the pixel-wise difference between the original signal and the filter signal. In order to improve the objective quality of the deblocked samples, the decision on whether to apply or not further filtering to the samples is performed separately from the decision on whether to apply or not further filtering to the samples not modified by the deblocking filter.

Regarding the term "modifiable" and/or "modified" by the deblocking filter, it denotes here the samples close to the boundary between the blocks, to which the deblocking filter could be applicable. Typically, the deblocking filtering is only applicable to 1, 2, or 3 samples nearest to the boundary. Irrespectively of whether the deblocking filtering is actually applied to the "modifiable samples", they may form a region for which the decision of enabling/disabling another filtering may be performed separately as described above. Some more details to decision and selection of the deblocking filter known from the prior art will be described below. It is noted that the present invention is not limited to separate indicators for modifiable and non-modifiable samples of the block. Alternatively, the truly modified and non-modified samples may form the separate regions for which the decision is performed individually.

The judging whether a second filter is to be applied to the block of samples may be performed based on the result of judging whether the deblocking filter is to be applied to the block of samples. Similarly, the coding of the indicator for indicating whether a second filter to be applied to the block of samples may be performed predictively with respect to the indicator indicating whether the deblocking filter is to be applied.

Figure 13:
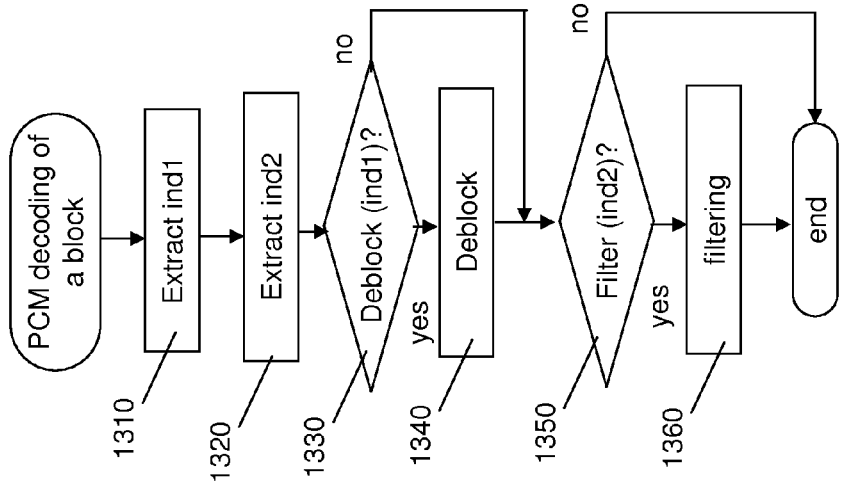
FIG. 13 is a flow diagram illustrating an example of a decoding method using deblocking filtering in accordance with an embodiment of the present invention.

FIG. 13 illustrates a method for decoding a block of samples in an image of a video signal according to an aspect of the present invention wherein the decoding from the bit stream of the PCM coded samples includes the step of extracting from the bit stream 1310 a deblocking filter indicator for indicating whether a deblocking filter is to be applied to the block of samples and extracting from the bit stream 1320 a second filter indicator separate (different) from the deblocking filter indicator for indicating whether a second filter is to be applied to the block of samples. When the deblocking filter indicator indicates that the deblocking filtering is to be applied ("yes" in step 1330) the deblocking 1340 is applied. Then, when the second filter indicator indicates that the second filter is to be applied ("yes" in step 1350) to the block, the second filter is applied 1360. If the respective indicators indicate that the respective filters are not to be applied then they are not applied.

Correspondingly to the encoder described above, the second filter indicator indicates whether both an adaptive loop filter and a sample adaptive offset are to be applied to the block of samples or there may be two different indicators extracted from the bit stream one for indicating whether an adaptive loop filter is to be applied to the block of samples and the other one indicating whether sample adaptive offset is to be applied to the block of samples. Alternatively or in addition, a modifiable sample indicator may be extracted and employed for indicating whether the second filter is to be applied to those samples of the block which could have been modified by the deblocking filtering and/or a non-modifiable sample indicator may indicate whether the second filter is to be applied to those samples of the block which may not have been modified by the deblocking filtering.

In accordance with another aspect of the preset invention, a method is provided for decoding a block of samples in an image of a video signal from a bitstream, the block of samples being coded with a pulse-coded modulation, PCM, the method comprising: extracting 1610 from the bitstream a PCM quantization parameter indicating amount of noise in the block of samples; selecting 1620 deblocking filter to be applied to the block based on the extracted PCM quantization parameter; and applying 1640 the selected deblocking filter to the block of samples.

Figure 16B:
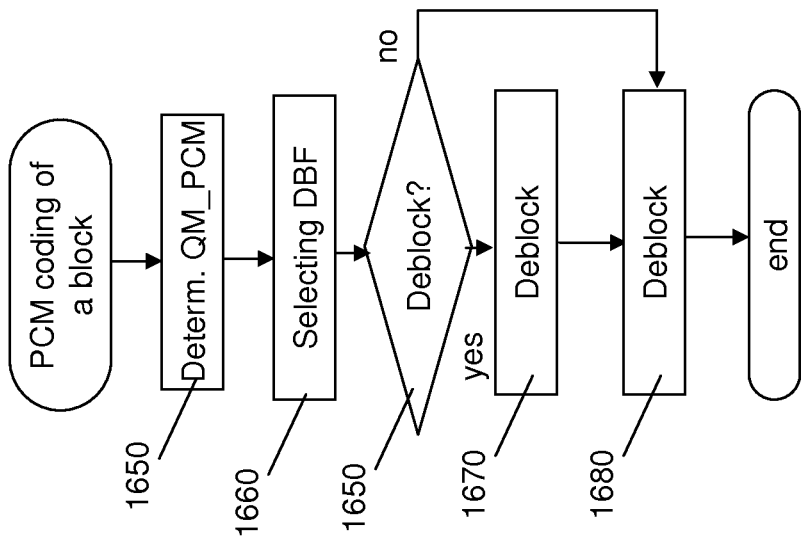
FIG. 16B is a flow diagram illustrating an example of a coding method for PCM coding and filtering of a block of samples.
Figure 16A:
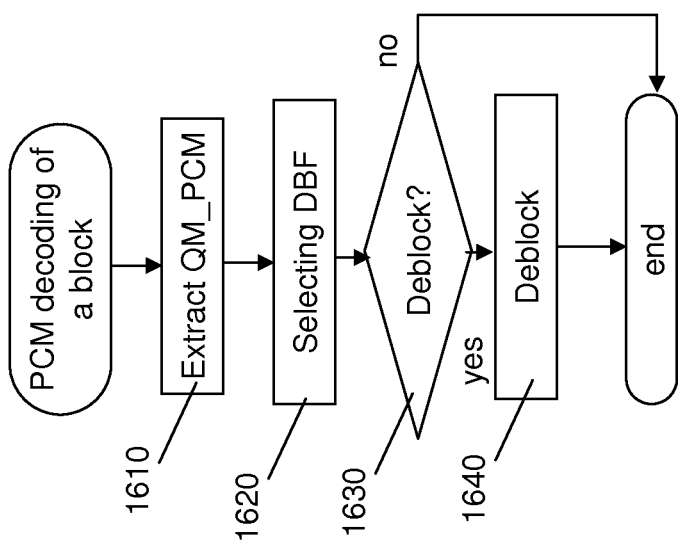
FIG. 16A is a flow diagram illustrating an example of a decoding method for decoding and filtering of PCM-coded samples.

An example of the decoding method is shown in FIG. 16A. In particular, the "PCM quantization parameter" is extracted 1610 from the bistream. Then, selection 1620 of the deblocking filter is performed according to the extracted PCM quantization parameter (QP_PCM), which may include a decision as to whether the deblocking filter is to be applied at all or not. Accordingly, when the deblocking filtering is to be applied ("yes" in step 1630), the block is filtered 1640 by the selected deblocking filter, otherwise, the block is not deblocked.

Similarly, a method is provided for coding a block of samples in an image of a video signal into a bitstream with a pulse-coded modulation, PCM, the method comprising: determining 1650 a PCM quantization parameter indicating amount of noise in the block of samples; selecting 1660 deblocking filter to be applied to the block based on the extracted PCM quantization parameter; applying 1670 the selected deblocking filter to the block of samples; and including 1680 into the bitstream the PCM quantization parameter. This is illustrated in a flow diagram of FIG. 16B.

The step of selecting the deblocking filter may be based on comparing a function of the PCM quantization parameter and the amount of quantization (or quantization step size) applied to a block adjacent to the block of samples to a predetermined threshold. In particular, it may be based on comparing a function of the PCM quantization parameter and the quantization parameter associated to the adjacent block.

The function may be an average. However, it may be also another function such as minimum, maximum, weighted average etc.

The step of selecting the deblocking filter may include a step of deciding whether or not to apply the deblocking filter to the block of samples, this step may be performed at both encoder and decoder on the same manner as well as the filter selection.

Alternatively or in addition, the step of selecting the deblocking filter may include selection of filter pass-band width (frequency response) and/or by selection of samples in the block, to which the filter is to be applied.

The PCM quantization parameter may depends on the bit depth of the PCM coding of the block samples. The PCM quantization parameter may be coded using prediction, and/or based on the bit depth of the PCM coded samples, and/or by an entropy code. The PCM quantization parameter may be embedded within the bitstream in a picture header, image slice header, information related to the block of samples, or additional information related to a plurality of video pictures.

According to another aspect of the present invention, an apparatus is provided for decoding a block of samples in an image of a video signal from a bitstream, the block of samples being coded with a pulse-coded modulation, PCM, the apparatus comprising: an extracting unit for extracting from the bitstream a PCM quantization parameter indicating amount of noise in the block of samples; a filter selection unit for selecting deblocking filter to be applied to the block based on the extracted PCM quantization parameter; and a filtering unit for applying the selected deblocking filter to the block of samples.

According to another aspect of the present invention, an apparatus is provided for coding a block of samples in an image of a video signal into a bitstream with a pulse-coded modulation, PCM, the apparatus comprising: a parameter determining unit for determining a PCM quantization parameter indicating amount of noise in the block of samples; a filter selection unit for selecting deblocking filter to be applied to the block based on the extracted PCM quantization parameter; a filtering unit for applying the selected deblocking filter to the block of samples; and an embedding unit for including into the bitstream the PCM quantization parameter.

The filter selection unit may be configured to select the deblocking filter based on comparing a function of the PCM quantization parameter and the quantization parameter associated to the adjacent block. The filter selection unit may be configured to decide whether or not to apply the deblocking filter to the block of samples. Alternatively, or in addition, the filter selection unit may be configured to select strength of the filter and/or to select a number and location of samples in the block, to which the filter is to be applied.

It is noted that the apparatus of the present invention may be implemented by modifying the particular filtering units (deblocking filtering unit 150 at the encoder and 250 at the decoder) and/or modifying the ALF and/or SAO filtering units to allow them judging, selecting and filtering as described above.

The parameter determining unit may be configured to determine PCM quantization parameter as a value maximizing the subjective quality after deblocking filtering or by estimating the PCM quantization parameter value as a quantization parameter that would lead to same noise if transform coding was applied.

Figures 15A, 15B:
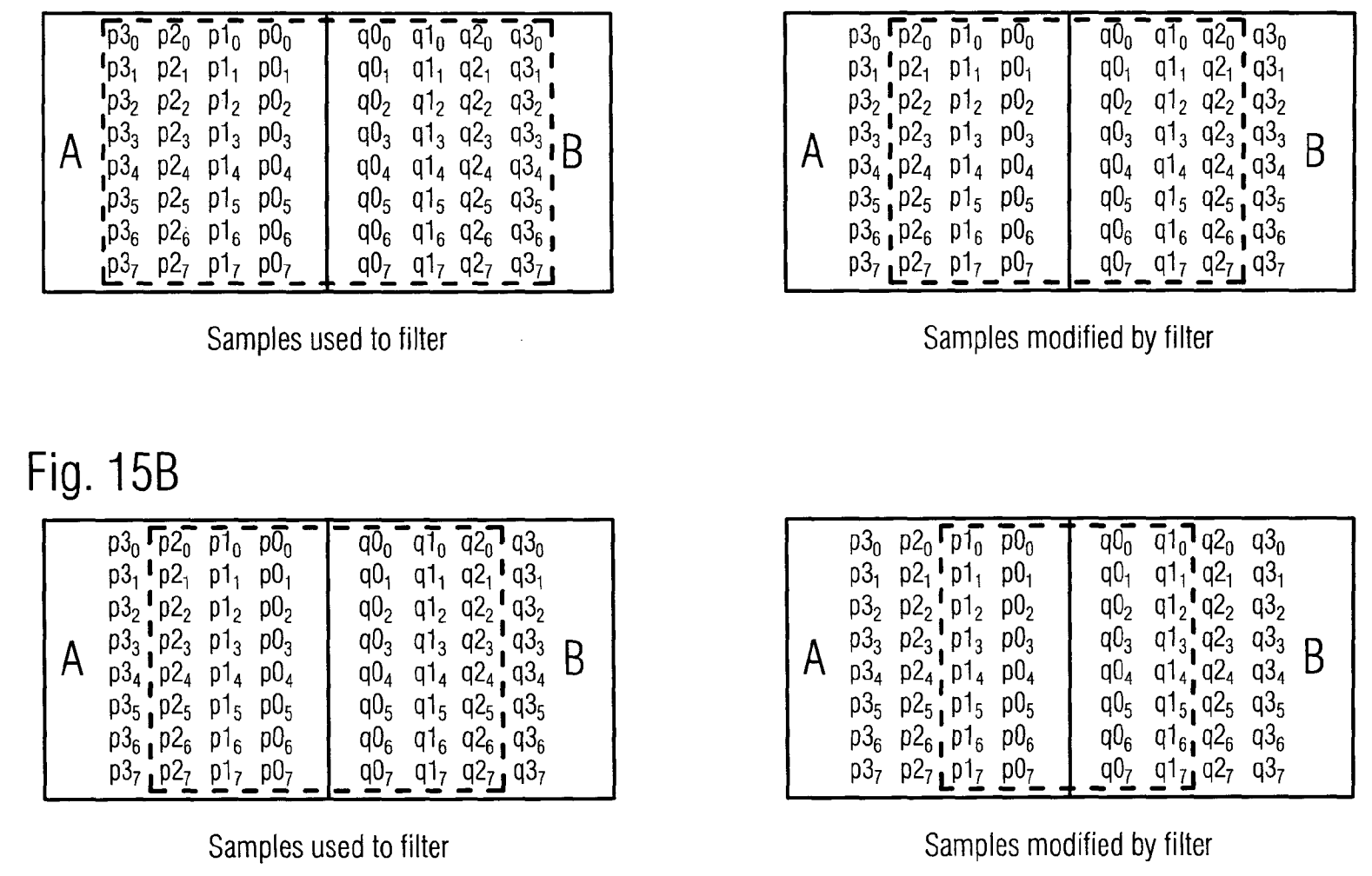

As described above, the decision and/or selection of the deblocking filter may be performed in accordance with the PCM quantization parameter. In accordance with another embodiment of the present invention, the deblocking filter selection and decision may be performed similarly for the cases in which PCM coded blocks are involved and the cases in which only non-PCM coded blocks are involved. In particular, referring to FIG. 15, There are basically three possibilities for the adjacent blocks A and B, in which deblocking filtering may be beneficial:

Block A is a non-PCM coded block and block B is also a non-PCM coded block. In such a case, block A is characterized by its quantization parameter, i.e. by the quantization parameter applied to coding of the block A ($QP_A$=QP(A)). Same applies to block B ($QP_B$=QP(B)).

Block A is a non-PCM coded block and block B is a PCM-coded block (or vice versa). In such a case, block A is characterized by its quantization parameter ($QP_A$=QP(A)). Block B is characterized by the estimated "PCM quantization parameter" indicating amount of noise in the block B ($QP_B$=$QP_{PCM}$(B)).

Both, block A and block B are PCM-coded blocks. In such a case, block A as well as block B is characterized by the estimated "PCM quantization parameter" indicating amount of noise in the block A $QP_A$=$QP_{PCM}$(A) and the block B ($QP_B$=$QP_{PCM}$(B)), respectively.

A function of the quantization parameters of block A and B may then be used for the decision and/or selection of the deblocking filter. For instance, the following functions of $QP_A$ and $QP_B$ may be implemented:

$$QP_{Ave} = (QP_A + QP_B + 1) \gg 1 \text{ or}$$

$$QP_{Ave} = \frac{QP_A + QP_B}{2} \text{ or}$$

$$QP_{Ave} = \text{Max}(QP_A, QP_B).$$

However, these are only examples and any other function may also be applied.

Figure 14:
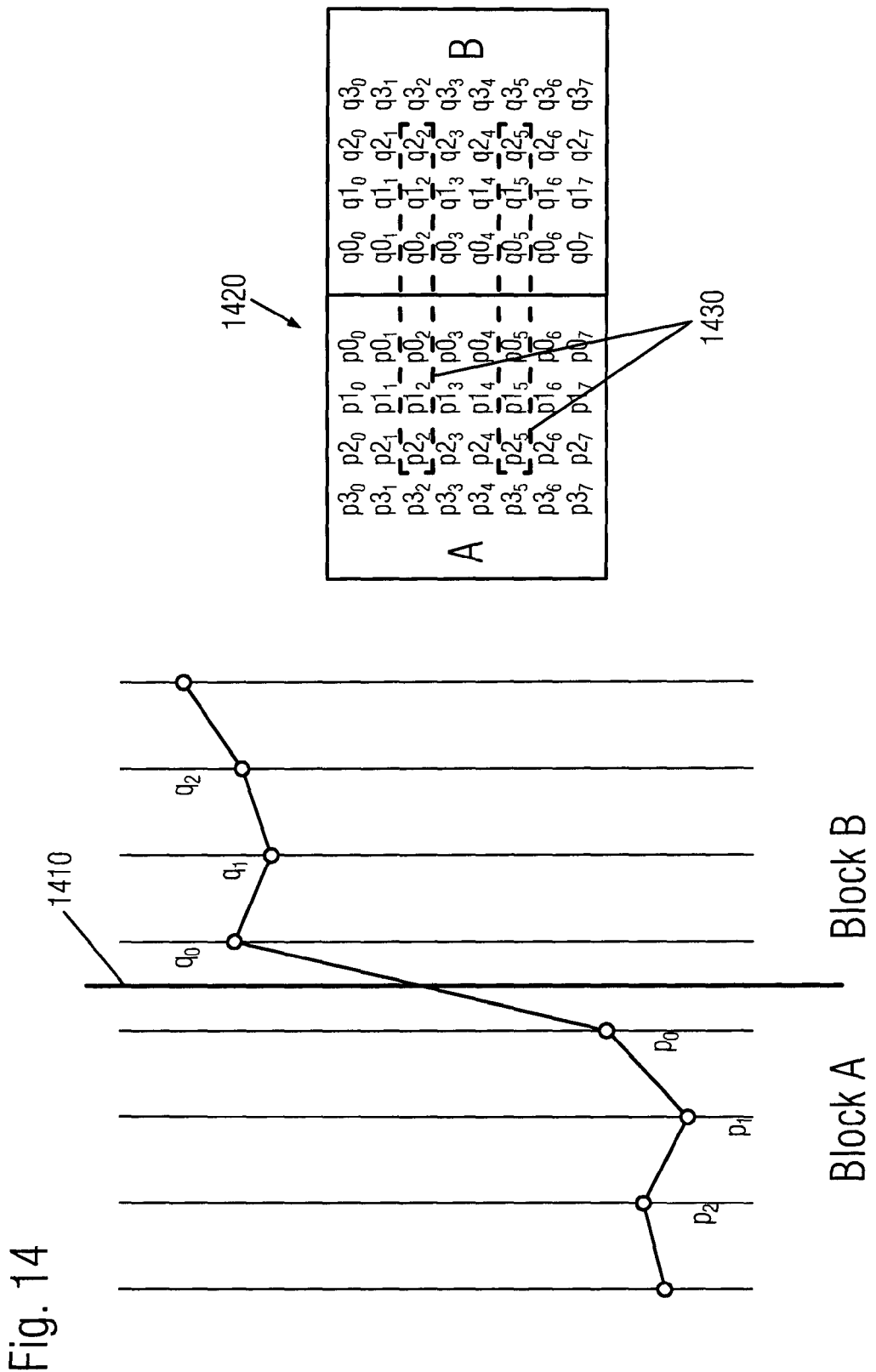
FIG. 14 is a schematic drawing illustrating deblocking filtering according to the prior art

Similarly to FIG. 14, first the decision may be performed as to whether the filtering is to be applied at all to the entire block A and/or B. For instance, deblocking may be enabled if $$d = d_q + d_p < \beta(QP_{Ave}).$$

When the deblocking filtering is enabled for the block A and/or B, it may be further decided line by line, whether the deblocking filtering is to be applied to the particular line (row or column) of the block. It may be decided to apply strong filtering when $$|p3_i - p0_i| + |q3_i - q0_i| < (\beta(QP_{Ave}) \gg 3) \wedge$$

$$d < (\beta(QP_{Ave}) \gg 2) \wedge$$

$$|p0_i - q0_i| < ((t_c(QP_{Ave}) \cdot 5 + 1) \gg 1).$$

Otherwise, a weak (or no) filtering is to be applied to the particular line i.

The strong filtering may then be performed as shown in the background section above. The delta value may also be calculated as shown above, namely as:

$$\Delta = (9 \cdot (q0_i - p0_i) - 3 \cdot (q1_i - p1_i) + 8) \gg 4$$

Then it is decided to filter only when $|\Delta| < 10 \cdot t_c(QP_{Ave})$. Otherwise, no deblocking filtering is performed. When the filtering is to be performed (weak deblocking filtering), then the following value (delta1) is calculated:

$$\Delta_1 = \text{Clip3}(-t_c(QP_{Ave}), t_c(QP_{Ave}), \Delta)$$

and the closest boundary pixels in both blocks A and B are filtered as follows:

$$p0'_i = \text{Clip}(p0_i - \Delta_1), q0'_i = \text{Clip}(q0_i - \Delta_1).$$

It is further decided, whether the second closest pixels to the boundary are to be filtered. Pixel p1 is filtered when $d_p < (\beta(QP_{Ave})/6)$, otherwise it is not filtered by the deblocking filter. Pixel q1 is filtered when $d_q < (\beta(QP_{Ave})/6)$, otherwise it is not filtered by the deblocking filter. The filtering is then performed as follows:

$$t_{c2}(QP_{Ave}) = t_c(QP_{Ave}) \gg 1$$

$$\Delta_{2p} = \text{Clip3}(-t_{c2}(QP_{Ave}), t_{c2}(QP_{Ave}), (((p2_i + p0_i + 1) \gg 1) - p1_i + \Delta_1) \gg 1)$$

$$p1'_i = \text{Clip}(p1_i + \Delta_{2p})$$

$$\Delta_{2q} = \text{Clip3}(-t_{c2}(QP_{Ave}), t_{c2}(QP_{Ave}), (((q2_i + q0_i + 1) \gg 1) - q1_i - \Delta_1) \gg 1)$$

$$q1'_i = \text{Clip}(q1_i + \Delta_{2q})$$

An advantage of the above approach is that the filtering of the PCM coded blocks and the non-PCM coded blocks may be performed in the same way, wherein the PCM quantization parameter is considered to represent the noise characteristics of the PCM coded block so that it may be used in the same way as the quantization parameter of the non-PCM blocks.

It is noted that in general, the PCM quantization parameter may also be considered to be an indicator for indicating whether the deblocking filtering is to be applied or not to the block of samples, since it may be also used for the decision whether to enable/disable the deblocking filter for the block/samples of the block.

The above examples all relate to blocks or coding units. However, as is clear to those skilled in the art, the present invention may also be applied to image areas of other forms (shape, size) than blocks or coding units used in HEVC.

The processing described in each of embodiments can be simply implemented in an independent computer system, by recording, in a recording medium, a program for implementing the configurations of the video coding method and the video decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment A

Figure 17:
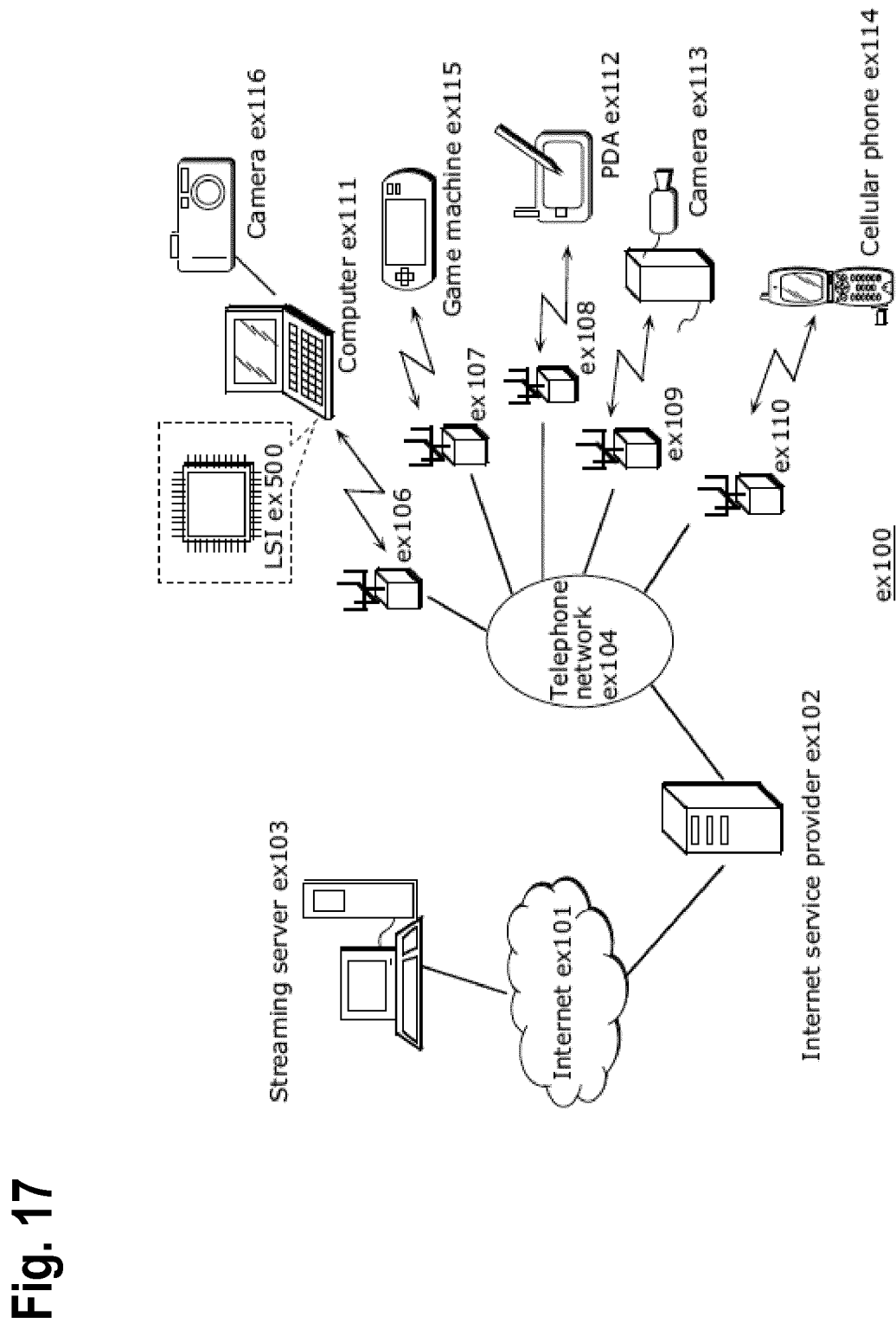
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
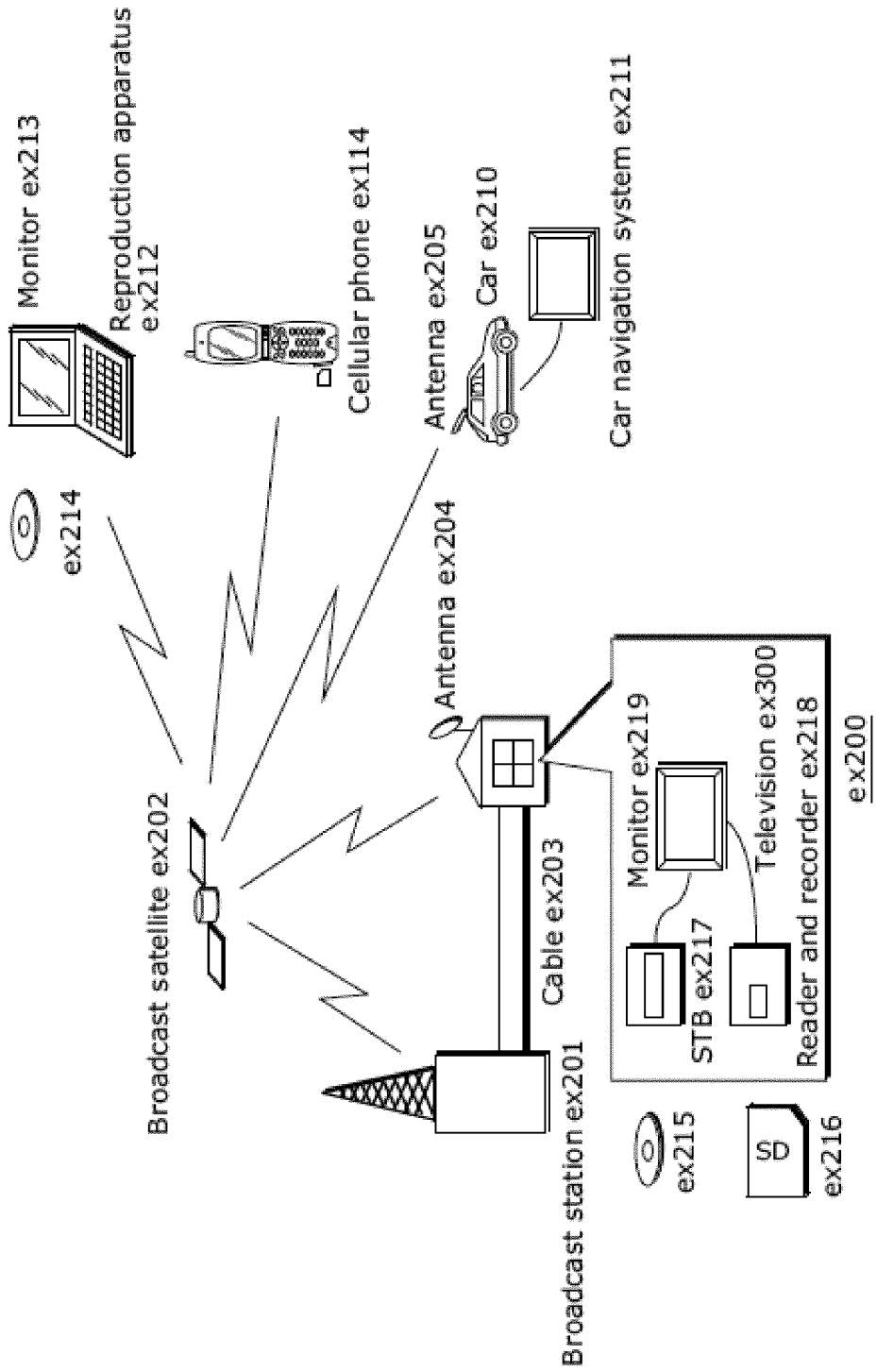
FIG. 18 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
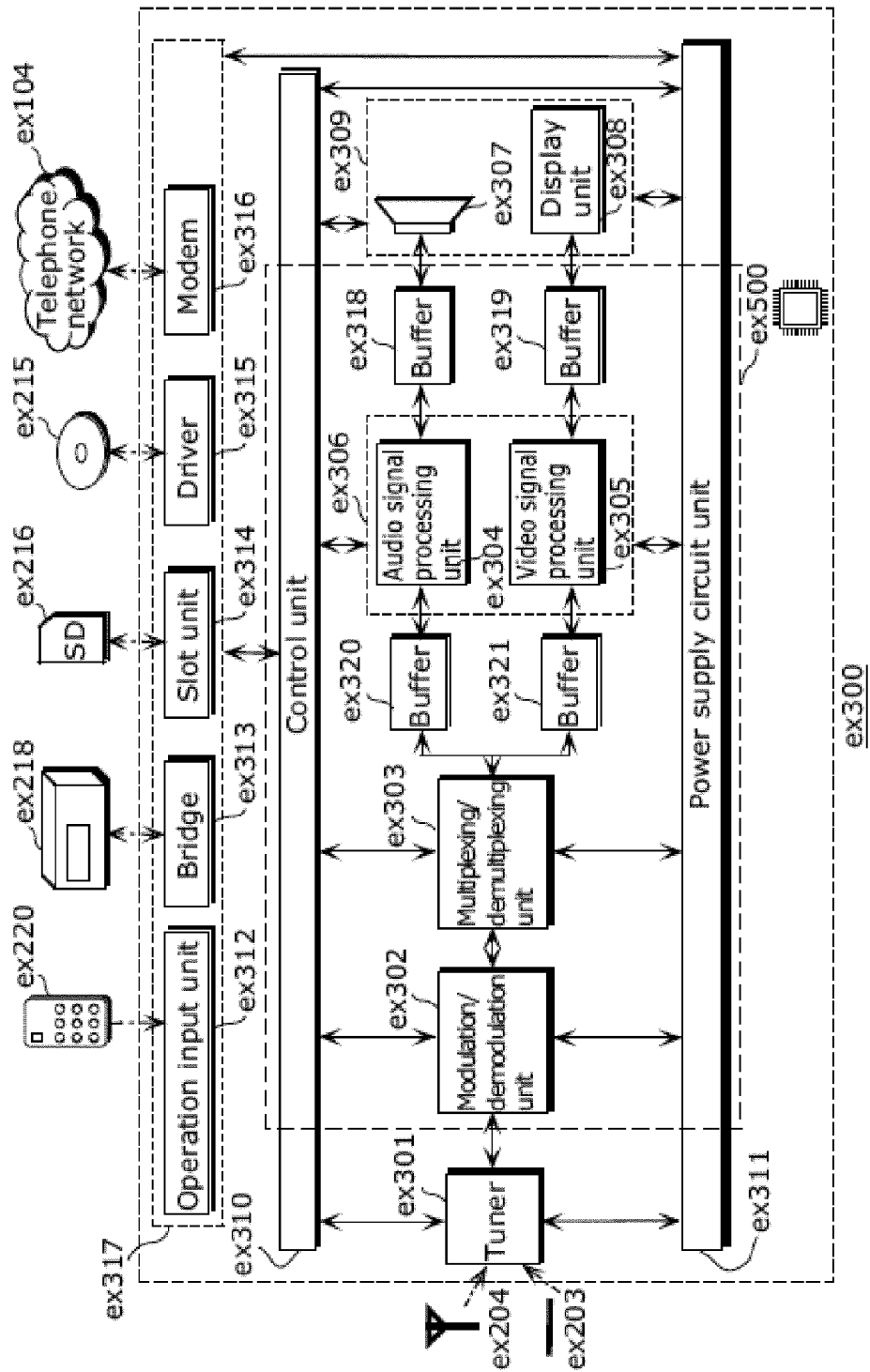
FIG. 19 shows a block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
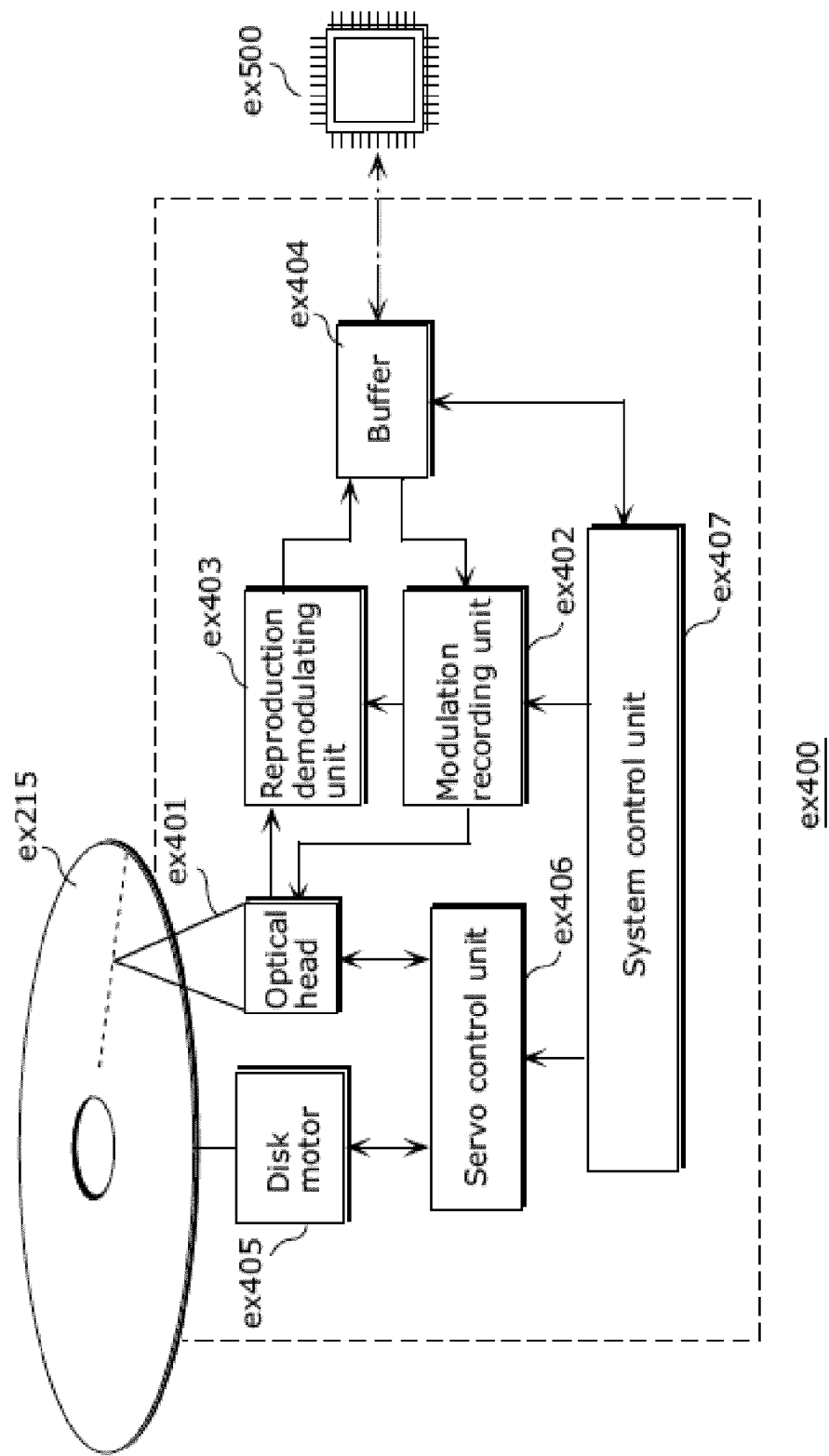
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
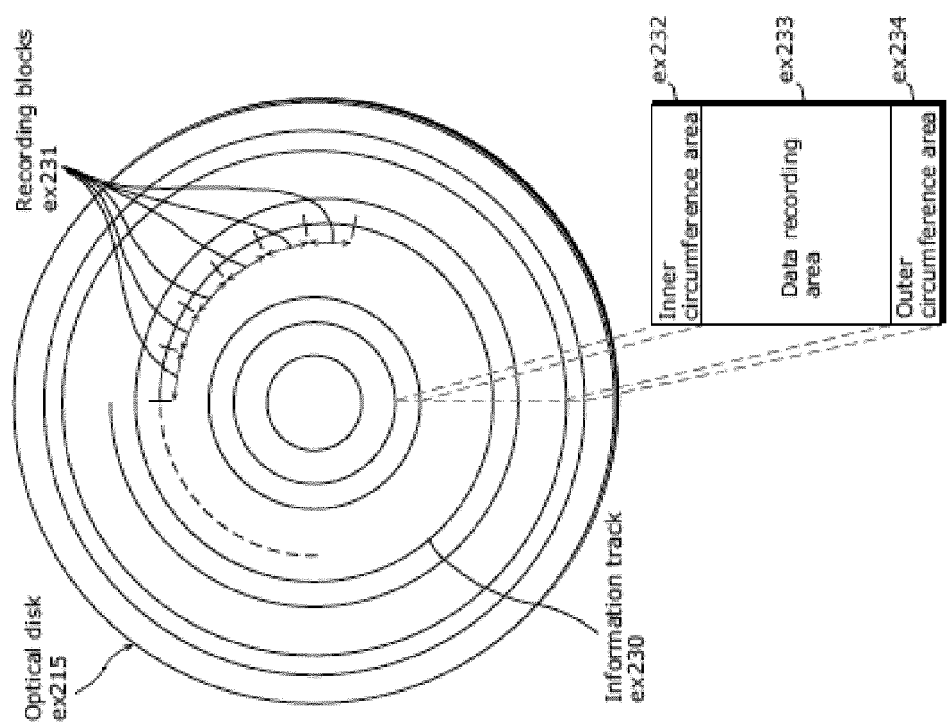
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface.

Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
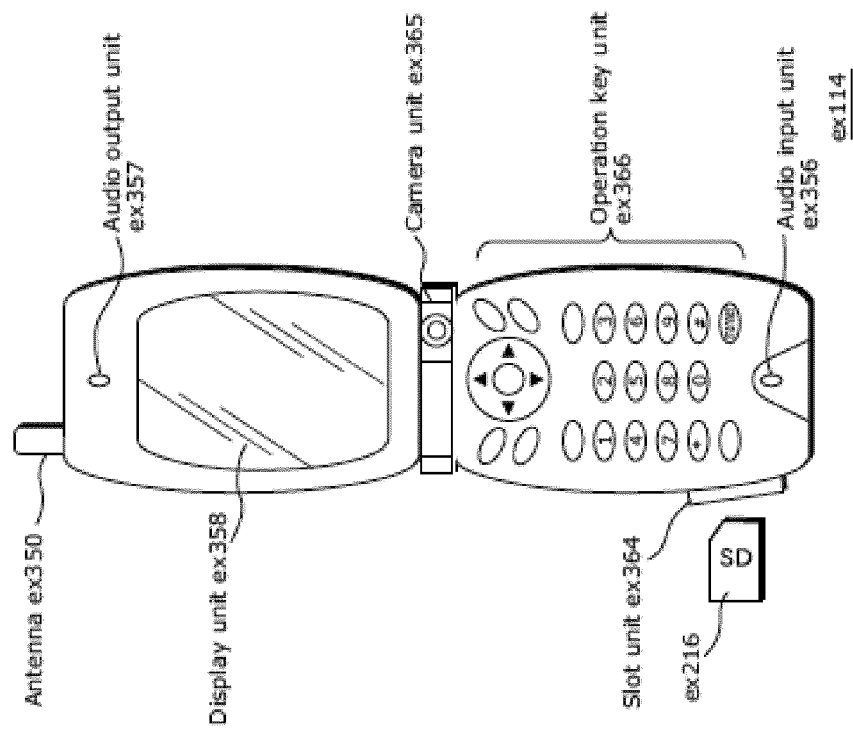
FIG. 22A shows an example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
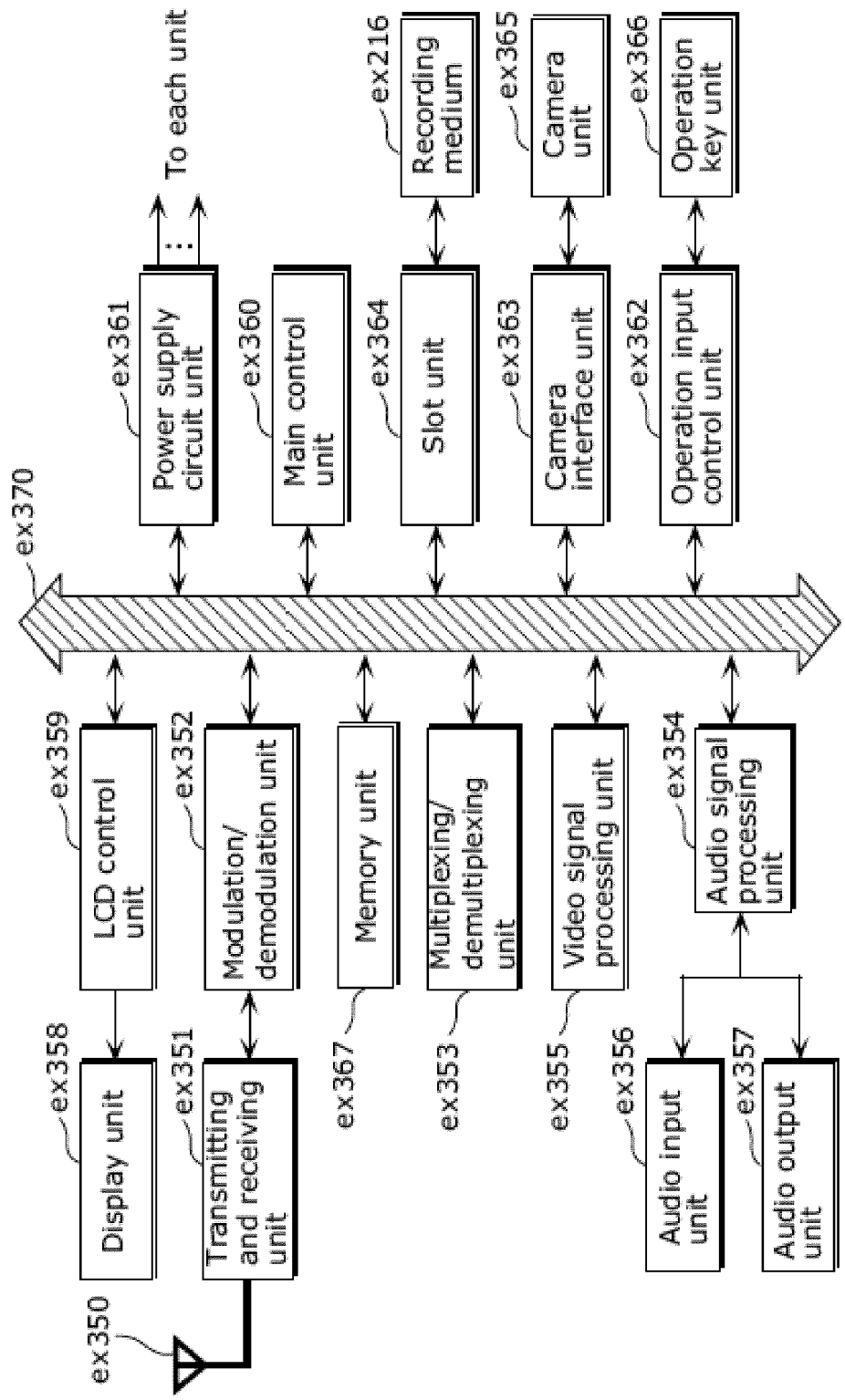
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment B

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
FIG. 23 illustrates a structure of multiplexed data.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
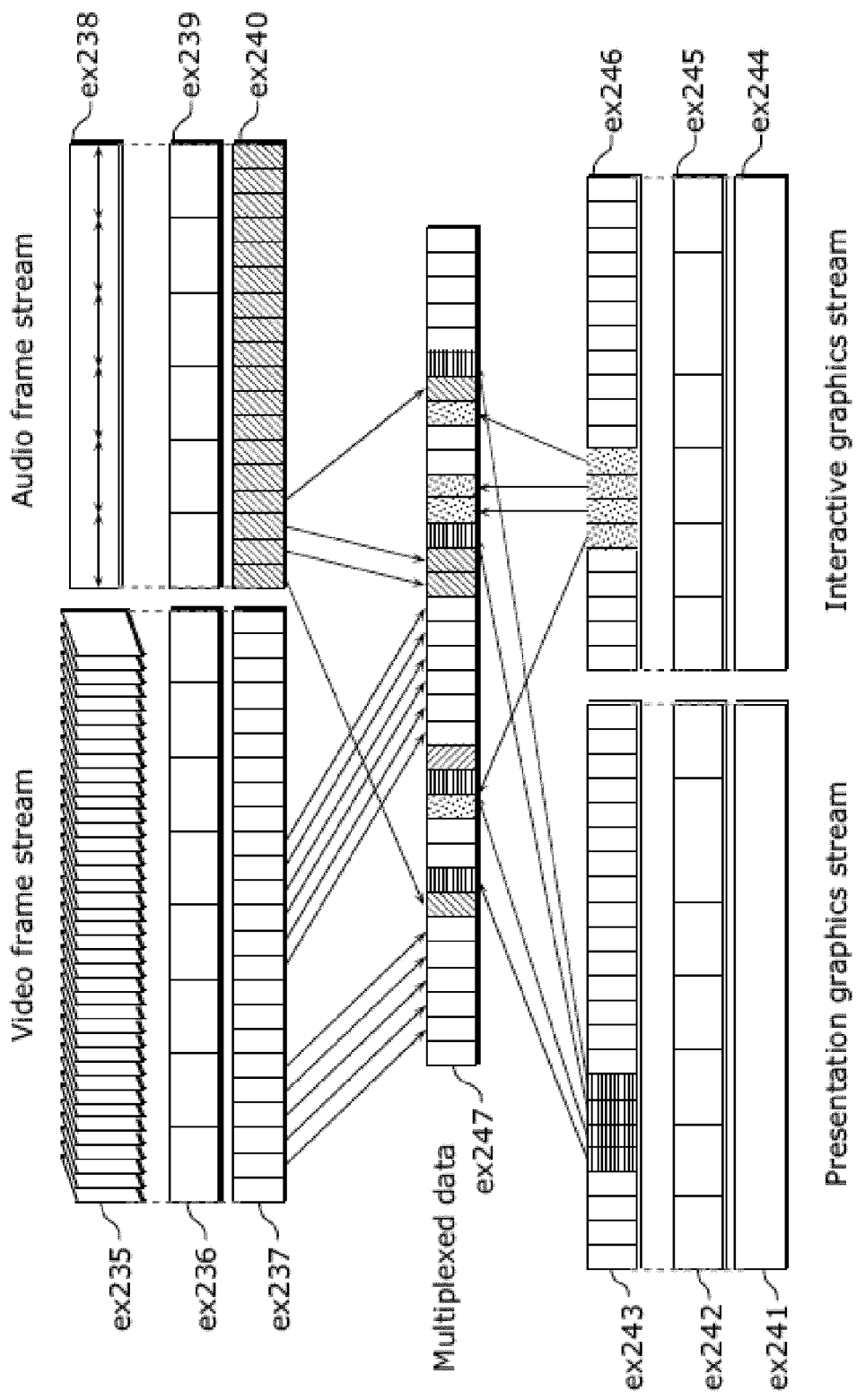
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
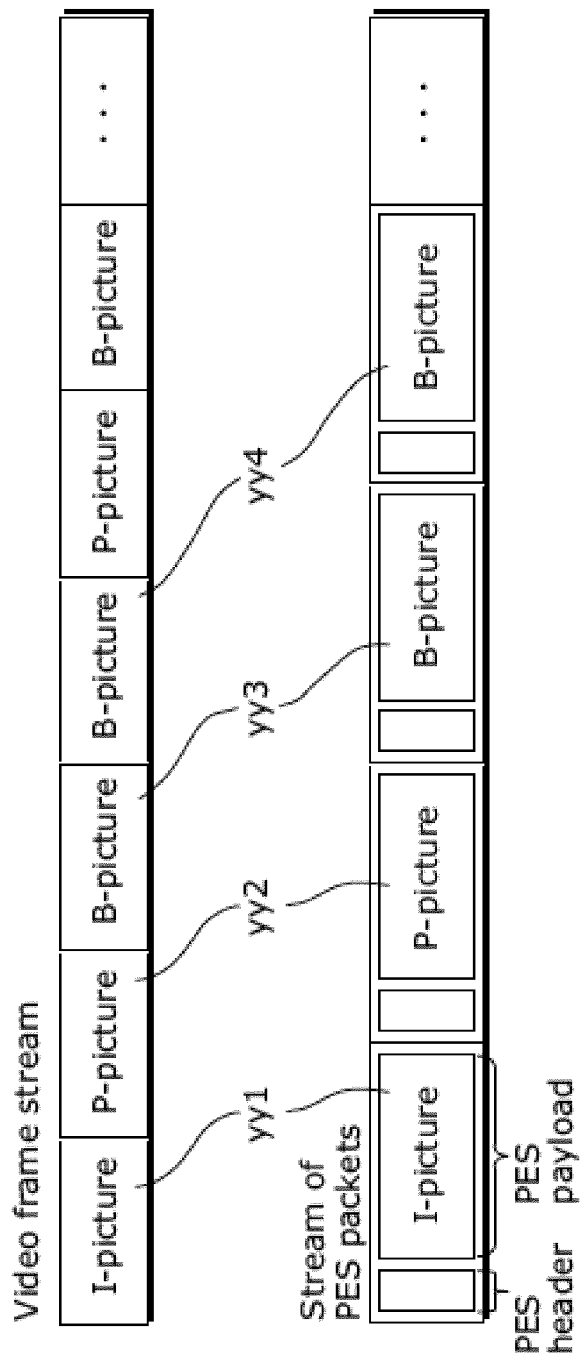
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 26:
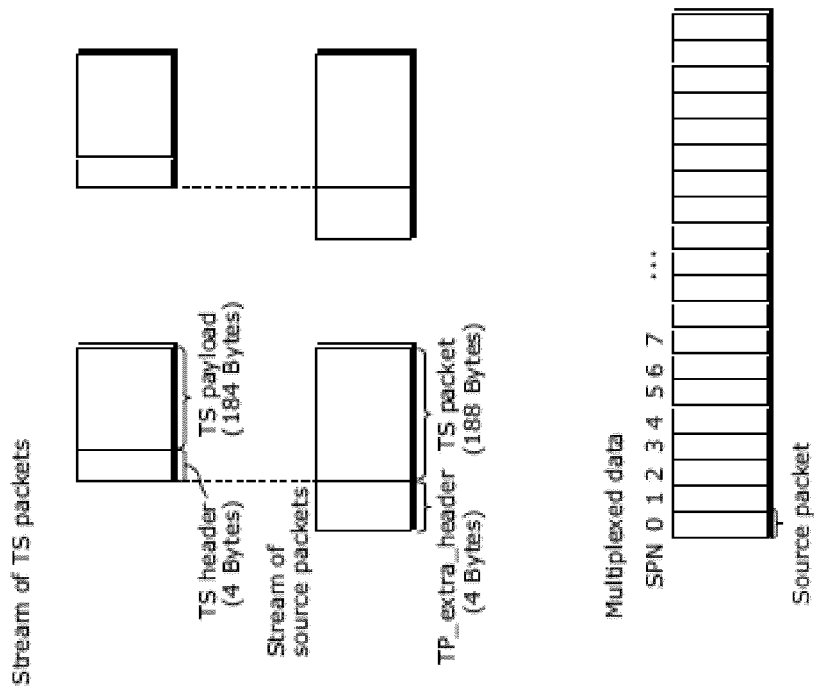
FIG. 26 shows a structure of TS packets and source packets in the multiplexed data.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
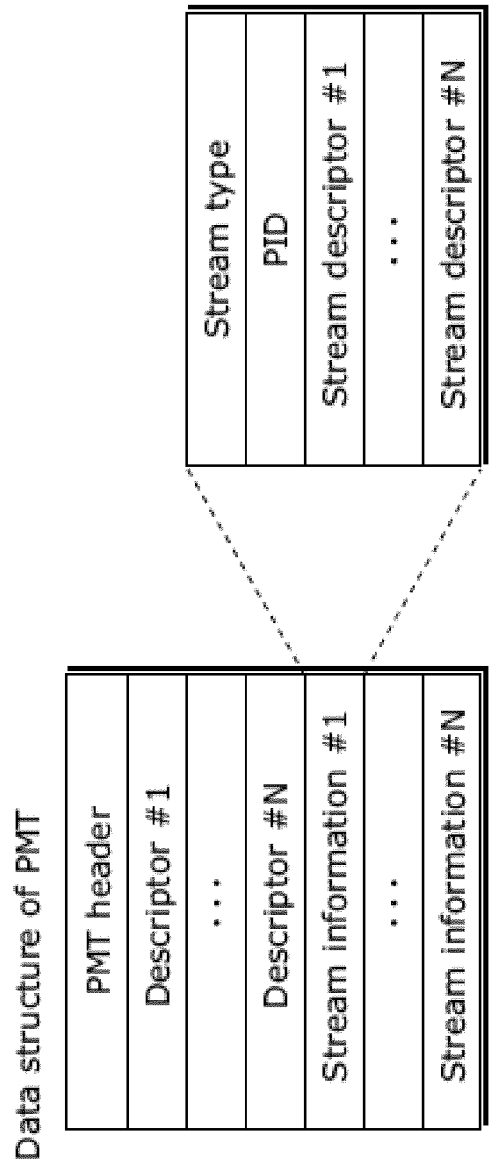
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
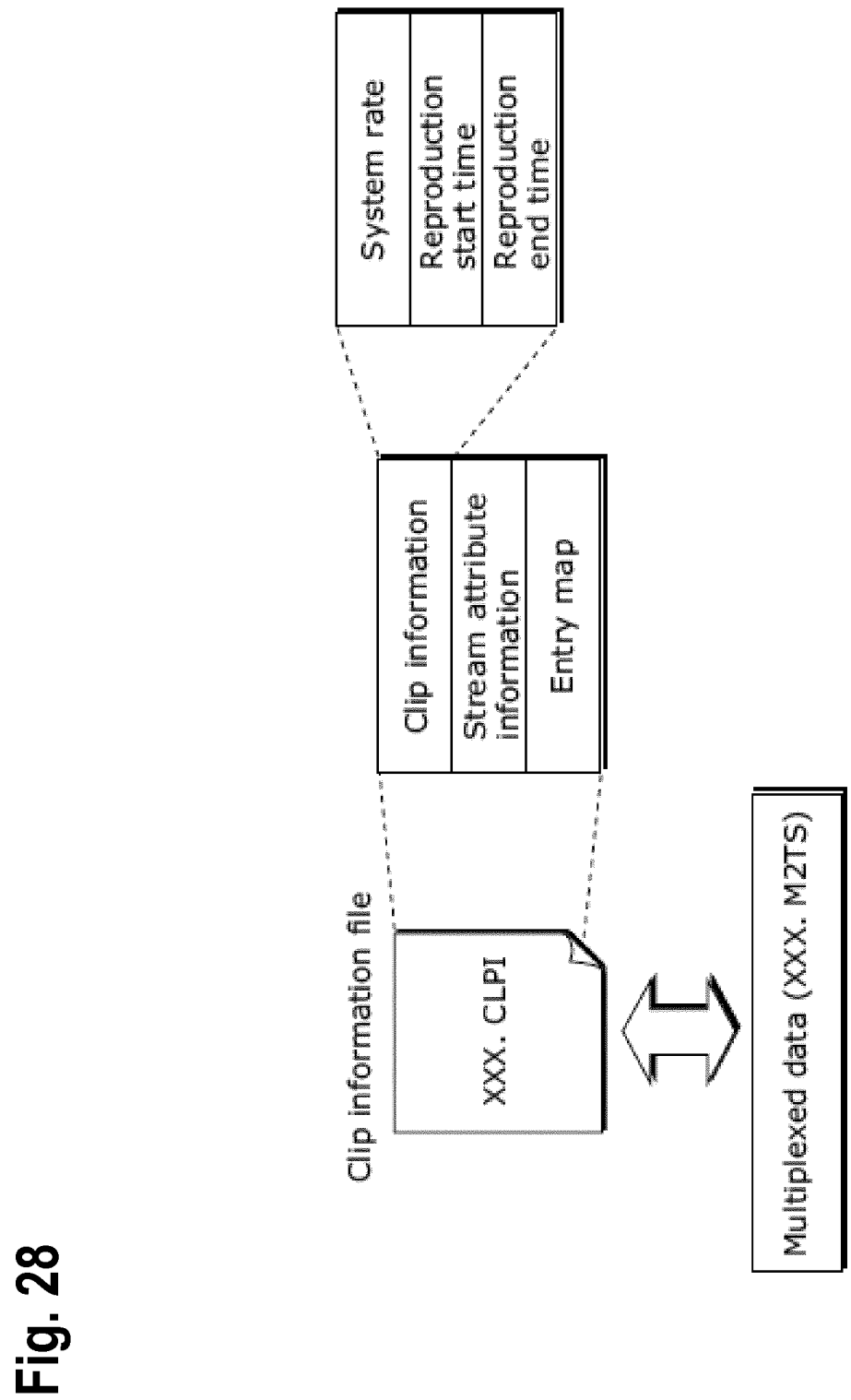
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
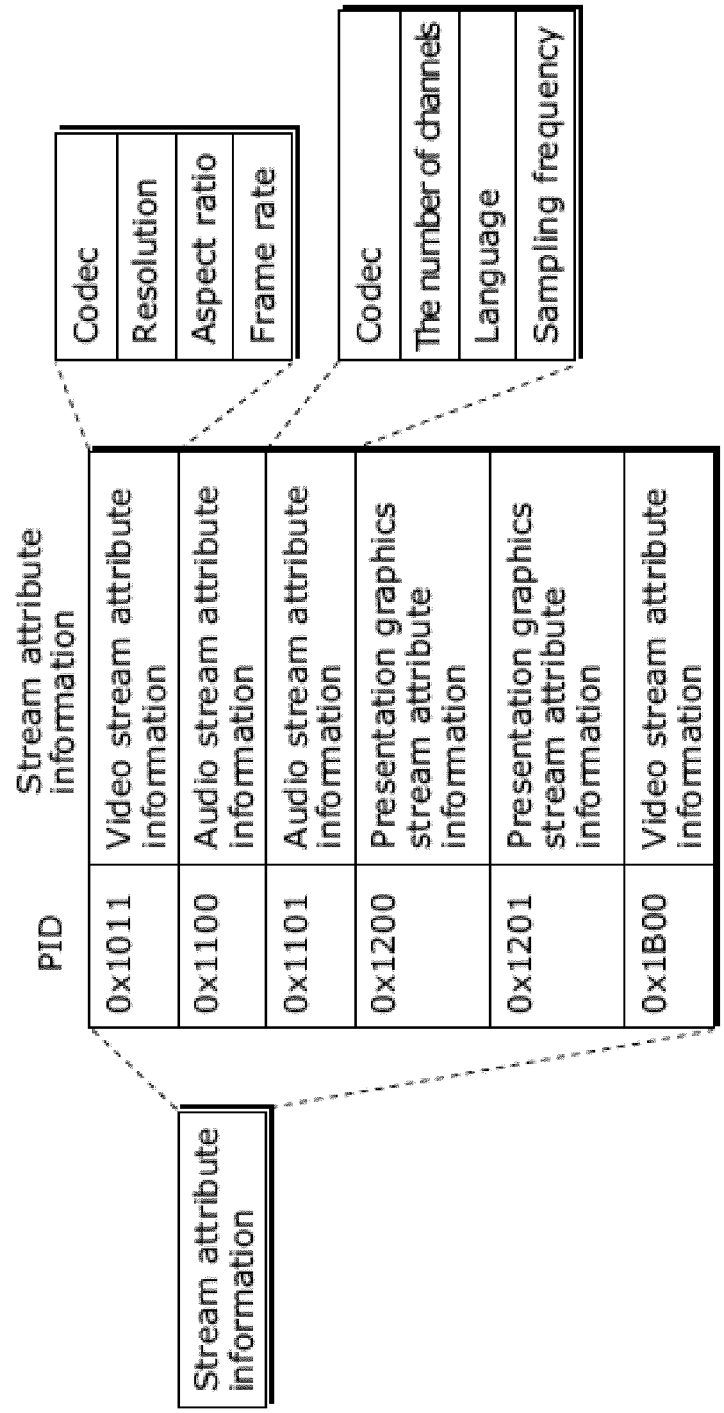
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
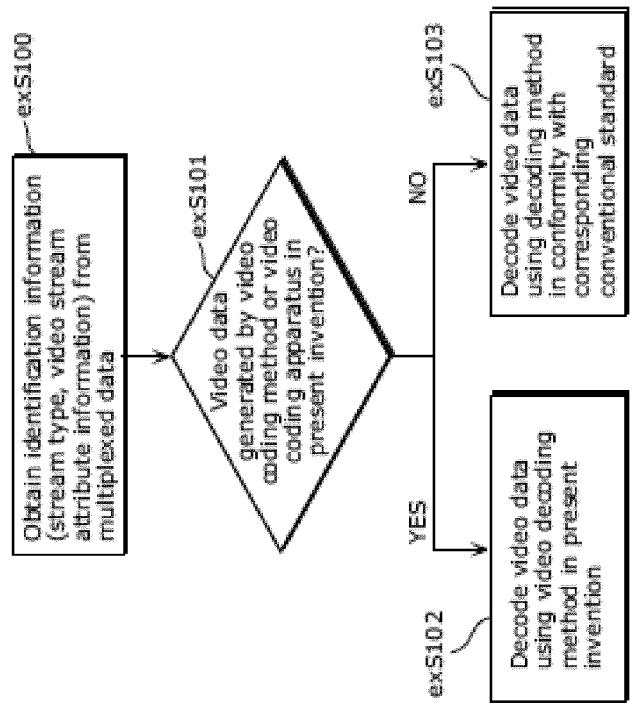
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment C

Figure 31:
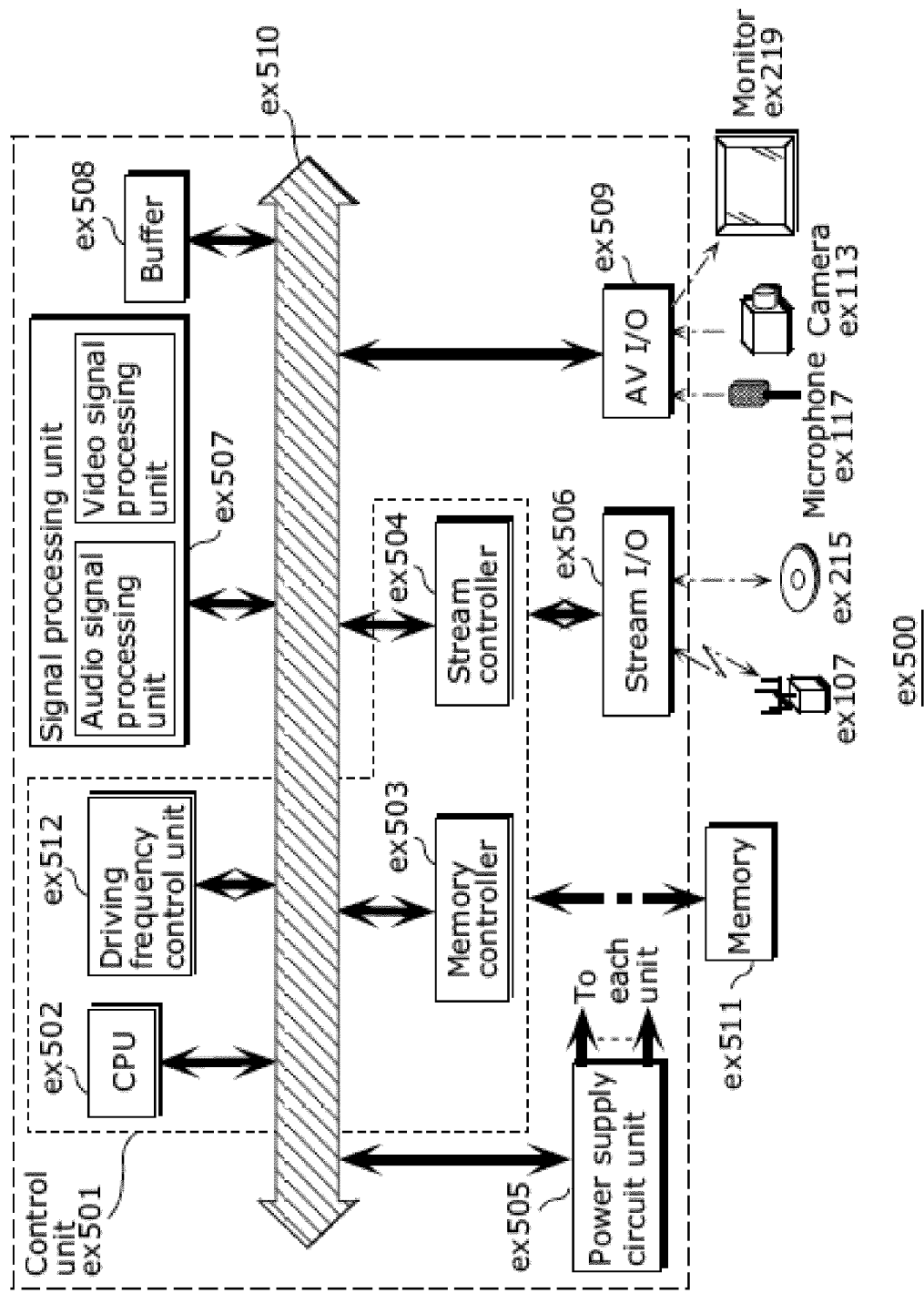
FIG. 31 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment D

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
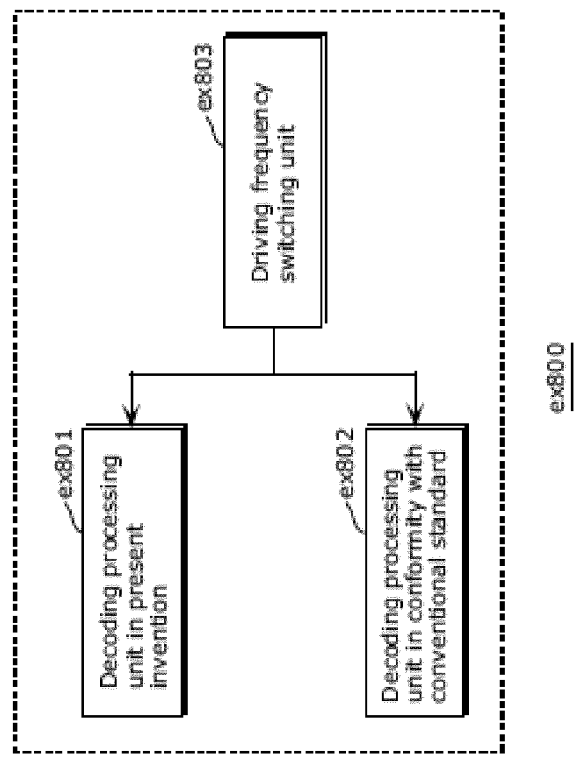
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
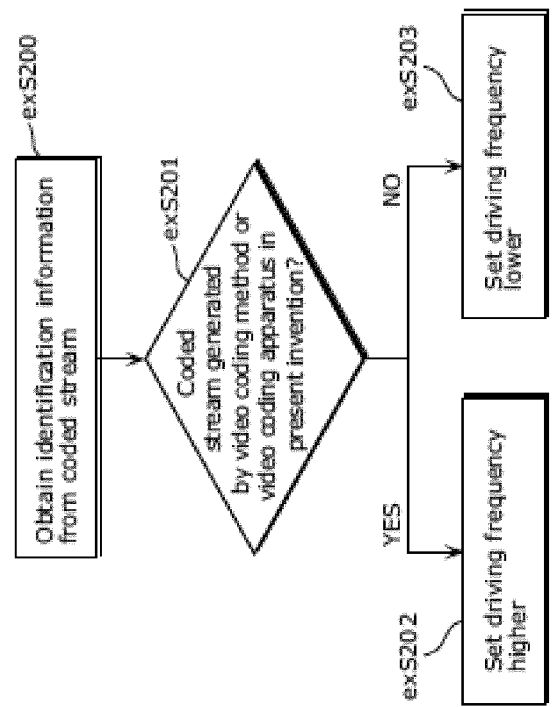
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment E

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
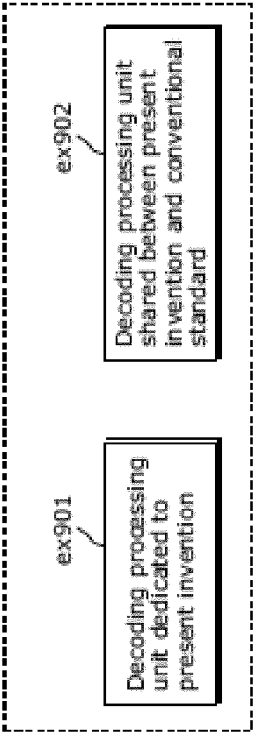
FIG. 35A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
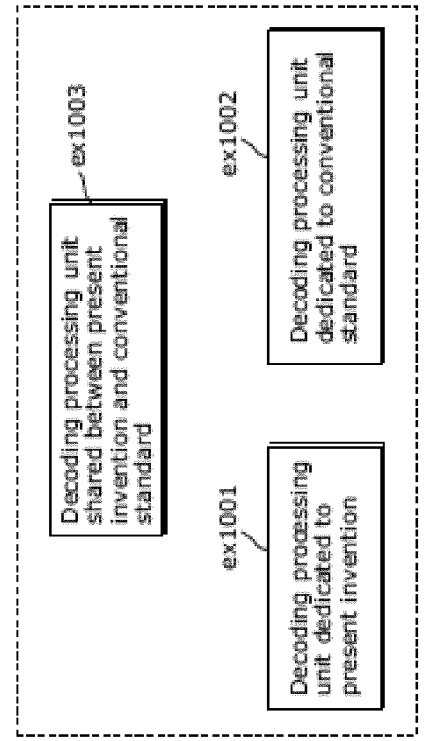
FIG. 35B is a diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Summarizing, the present invention relates to deblocking filtering which is applicable to smoothing the block boundaries in an image or video coding and decoding. In particular, the present invention relates to filtering pulse code modulation (PCM) coded block of samples. Accordingly, a separate indicator for enabling or disabling the deblocking filtering of the PCM coded block and a separate indicator for enabling or disabling a second filtering are embedded into the coded bitstream to individually switch on or off deblocking filtering and another kind of filtering such as adaptive loop filtering or sample adaptive offset.

Moreover, the present invention relates to coding of an image of a video sequence block wisely and, in particular, to coding of a block of samples, which may be chrominace or luminance samples, or samples of any colour space, by a pulse code modulation (PCM). After PCM coding, deblocking filtering may be applied. The deblocking filter may be selected for the present PCM coded block based on its noise and/or the noise of its adjacent block. The noise of the PCM coded block is indicated by a PCM quantization parameter, which is also encoded in the bitstream.

The invention claimed is:

1. A method for coding a block of samples of a video signal into a bitstream with a pulse-coded modulation, PCM, the method comprising:
   applying bit depth extension to the video signal;
   switching the video signal between a PCM coding mode or prediction and transform coding;
   determining a PCM quantization parameter indicating amount of noise in the block of samples of the video signal;
   selecting a deblocking filter to be applied to the block based on the determined PCM quantization parameter and an amount of quantization applied to a block adjacent to the block of samples;
   applying the selected deblocking filter to the block of samples; and
   including into the bitstream the PCM quantization parameter,
   wherein in the selecting a deblocking filter, the deblocking filter is selected based on comparing, to a predetermined threshold, a function of the determined PCM quantization parameter and the amount of quantization applied to the block adjacent to the block of samples, and
   wherein the function is one of an average, a minimum, a maximum, and a weighted average.

2. The method according to claim 1, further comprising:
   reducing bit depth to the video signal to be coded by the PCM coding mode and outputting a reduced video signal.

3. An apparatus for coding a block of samples of a video signal into a bitstream with a pulse-coded modulation, PCM, the apparatus comprising:
   an applying unit for applying bit depth extension to the video signal;
   a switching unit for switching the video signal between a PCM coding mode or prediction and transform coding;
   a parameter determining unit for determining a PCM quantization parameter indicating amount of noise in the block of samples of the video signal;
   a filter selection unit for selecting a deblocking filter to be applied to the block based on the determined PCM quantization parameter and an amount of quantization applied to a block adjacent to the block of samples;
   a filtering unit for applying the selected deblocking filter to the block of samples; and
   an embedding unit for including into the bitstream the PCM quantization parameter,
   wherein the filter selection unit selects the deblocking filter based on comparing, to a predetermined threshold, a function of the determined PCM quantization parameter and the amount of quantization applied to the block adjacent to the block of samples, and
   wherein the function is one of an average, a minimum, a maximum, and a weighted average.

4. The apparatus according to claim 3, further comprising:
   a reducing unit for reducing bit depth to the video signal to be coded by the PCM coding mode and outputting a reduced video signal.

5. A method for coding a block of samples of a video signal into a bitstream with a pulse-coded modulation, PCM, the method comprising:
   switching the samples between a PCM coding mode and prediction/transform coding mode;
   determining a PCM quantization parameter indicating amount of noise in the block of the samples;
   selecting a deblocking filter and an adaptive loop filter to be applied to the block based on the determined PCM quantization parameter and an amount of quantization applied to a block adjacent to the block of samples;
   applying the selected deblocking filter and the adaptive loop filter to the block of the samples; and
   including into the bitstream the PCM quantization parameter,
   wherein in the selecting a deblocking filter, the deblocking filter is selected based on comparing, to a predetermined threshold, a function of the determined PCM quantization parameter and the amount of quantization applied to the block adjacent to the block of samples, and
   wherein the function is one of an average, a minimum, a maximum, and a weighted average.

6. The method according to claim 5, further comprising:
   outputting the samples coded from the PCM coding mode.

7. An apparatus for coding a block of samples of a video signal into a bitstream with a pulse-coded modulation, PCM, the apparatus comprising:
   an applying unit for increasing bit depth of the samples;
   a switching unit for switching the samples between a PCM coding mode and prediction/transform coding mode;
   a parameter determining unit for determining a PCM quantization parameter indicating amount of noise in the block of the samples;
   a filter selection unit for selecting a deblocking filter and an adaptive loop filter to be applied to the block based on the determined PCM quantization parameter and an amount of quantization applied to a block adjacent to the block of samples;
   a filtering unit for applying the selected deblocking filter and the adaptive loop filter to the block of the samples; and
   an embedding unit for including into the bitstream the PCM quantization parameter,
   wherein the filter selection unit selects the deblocking filter based on comparing, to a predetermined threshold, a function of the determined PCM quantization parameter and the amount of quantization applied to the block adjacent to the block of samples, and
   wherein the function is one of an average, a minimum, a maximum, and a weighted average.

8. The method according to claim 7, further comprising:
   an outputting unit for outputting the samples from the PCM coding mode.

* * * * *